(12) United States Patent
Leise et al.

(10) Patent No.: US 10,719,501 B1
(45) Date of Patent: Jul. 21, 2020

(54) SYSTEMS AND METHODS FOR ANALYZING VEHICLE SENSOR DATA VIA A BLOCKCHAIN

(71) Applicant: STATE FARM MUTUAL AUTOMOBILE INSURANCE COMPANY, Bloomington, IL (US)

(72) Inventors: William J. Leise, Normal, IL (US); Jacob J. Alt, Downs, IL (US); Jaime Skaggs, Chenoa, IL (US); Eric Bellas, Bloomington, IL (US); Shawn M. Call, Bloomington, IL (US); Eric R. Moore, Heyworth, IL (US); Melinda Teresa Magerkurth, Utica, IL (US); Vicki King, Bloomington, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 297 days.

(21) Appl. No.: 15/910,141

(22) Filed: Mar. 2, 2018

Related U.S. Application Data

(60) Provisional application No. 62/557,403, filed on Sep. 12, 2017, provisional application No. 62/557,415, (Continued)

(51) Int. Cl.
*G06F 16/23* (2019.01)
*H04L 9/06* (2006.01)
(Continued)

(52) U.S. Cl.
CPC ...... *G06F 16/2358* (2019.01); *G06F 16/9024* (2019.01); *G06Q 40/08* (2013.01); *H04L 9/0643* (2013.01)

(58) Field of Classification Search
CPC . G06F 16/2358; G06F 16/9024; G06Q 40/08; H04L 9/0643
(Continued)

(56) References Cited

U.S. PATENT DOCUMENTS 5,825,283 A * 10/1998 Camhi .................. B60R 25/102
340/438
5,950,169 A 9/1999 Borghesi et al.
(Continued)

OTHER PUBLICATIONS

Cointelegraph, "HashCoin Uses Emercoin Blockchain for Vehicle Registration and Tracking". Retrieved from the Internet at: <https://cointelegraph.com/news/hashcoin-uses-emercoin-blockchain-for-vehicle-registration-and-tracking> (2018).
(Continued)

*Primary Examiner* — Dung K Chau
(74) *Attorney, Agent, or Firm* — Marshall, Gerstein & Borun LLP

(57) ABSTRACT

The present embodiments relate to systems and methods for using a blockchain to record information related to processes and services in the vehicle industry. The systems and methods may include (1) receiving an indication of vehicle being involved a vehicle collision and a vehicle VIN; (2) accessing, at a memory, a loss history blockchain associated with the vehicle using the VIN as a key; (3) receiving vehicle sensor data generated or collected prior to, during, and/or after the vehicle collision; (4) creating a block to add to the loss history blockchain that includes the vehicle sensor data, or otherwise updating the loss history blockchain with the vehicle sensor data associated with the vehicle collision; (5) analyzing the vehicle sensor data to reconstruct the vehicle collision; and/or (6) updating the loss history blockchain to include and/or indicate the reconstructed vehicle collision by including the created block.

20 Claims, 20 Drawing Sheets

Related U.S. Application Data filed on Sep. 12, 2017, provisional application No. 62/557,393, filed on Sep. 12, 2017, provisional application No. 62/557,433, filed on Sep. 12, 2017, provisional application No. 62/557,359, filed on Sep. 12, 2017, provisional application No. 62/557,446, filed on Sep. 12, 2017, provisional application No. 62/550,224, filed on Aug. 25, 2017, provisional application No. 62/550,186, filed on Aug. 25, 2017, provisional application No. 62/550,131, filed on Aug. 25, 2017, provisional application No. 62/550,140, filed on Aug. 25, 2017, provisional application No. 62/550,172, filed on Aug. 25, 2017, provisional application No. 62/550,245, filed on Aug. 25, 2017, provisional application No. 62/550,261, filed on Aug. 25, 2017, provisional application No. 62/550,197, filed on Aug. 25, 2017, provisional application No. 62/501,621, filed on May 4, 2017, provisional application No. 62/500,977, filed on May 3, 2017, provisional application No. 62/469,070, filed on Mar. 9, 2017, provisional application No. 62/468,092, filed on Mar. 7, 2017, provisional application No. 62/466,917, filed on Mar. 3, 2017.

(51) Int. Cl.
*G06Q 40/08* (2012.01)
*G06F 16/901* (2019.01)

(58) Field of Classification Search
USPC .......................................................... 707/609
See application file for complete search history.

(56) References Cited

U.S. PATENT DOCUMENTS

| | | | |
|---|---|---|---|
| 6,714,894 B1 | 3/2004 | Tobey et al. | |
| 6,898,574 B1 | 5/2005 | Regan | |
| 7,359,821 B1* | 4/2008 | Smith | G07C 5/002 |
| | | | 702/113 |
| 8,046,281 B1 | 10/2011 | Urrutia | |
| 8,311,856 B1 | 11/2012 | Hanson et al. | |
| 8,615,473 B2 | 12/2013 | Spiegel et al. | |
| 9,000,903 B2* | 4/2015 | Bowers | B60Q 1/00 |
| | | | 340/435 |
| 9,646,345 B1 | 5/2017 | Leise | |
| 9,672,719 B1 | 6/2017 | Hollenstain et al. | |
| 10,145,684 B1* | 12/2018 | Tofte | B64D 47/08 |
| 10,156,848 B1* | 12/2018 | Konrardy | G01C 21/34 |
| 10,445,302 B2 | 10/2019 | Childress et al. | |
| 10,521,780 B1 | 12/2019 | Hopkins et al. | |
| 2002/0007289 A1 | 1/2002 | Malin et al. | |
| 2002/0165791 A1 | 11/2002 | Segawa et al. | |
| 2004/0111301 A1* | 6/2004 | Wahlbin | G06Q 10/10 |
| | | | 705/4 |
| 2005/0065711 A1 | 3/2005 | Dahlgren et al. | |
| 2006/0095302 A1 | 5/2006 | Vahidi et al. | |
| 2006/0168185 A1 | 7/2006 | McCall et al. | |
| 2006/0287807 A1 | 12/2006 | Teffer | |
| 2007/0204078 A1 | 8/2007 | Boccon-Gibod et al. | |
| 2008/0103785 A1 | 5/2008 | Logan | |
| 2008/0122603 A1 | 5/2008 | Plante et al. | |
| 2008/0147266 A1 | 6/2008 | Plante et al. | |
| 2012/0076437 A1* | 3/2012 | King | G06Q 10/10 |
| | | | 382/286 |
| 2013/0339189 A1 | 12/2013 | Minerick | |
| 2014/0039935 A1 | 2/2014 | Rivera Gabriel Ernesto | |
| 2014/0077972 A1 | 3/2014 | Rathi et al. | |
| 2015/0154712 A1 | 6/2015 | Cook | |
| 2015/0170288 A1 | 6/2015 | Harton et al. | |
| 2017/0017734 A1* | 1/2017 | Groh | G06F 30/20 |
| 2017/0046792 A1 | 2/2017 | Haldenby et al. | |
| 2017/0116693 A1 | 4/2017 | Rae et al. | |
| 2017/0228371 A1 | 8/2017 | Seger, II | |
| 2017/0372431 A1 | 12/2017 | Perl et al. | |
| 2018/0018723 A1 | 1/2018 | Nagla et al. | |
| 2018/0143995 A1 | 5/2018 | Bailey et al. | |
| 2018/0165588 A1 | 6/2018 | Saxena et al. | |
| 2018/0253464 A1 | 9/2018 | Kohli et al. | |
| 2018/0337769 A1 | 11/2018 | Gleichauf | |
| 2018/0342036 A1 | 11/2018 | Zachary | |

OTHER PUBLICATIONS

"Blockchain in the Insurance Sector", PricewaterhouseCoopers LLP (2016).

Lawrence S. Powell, Kathleen A. McCullough, Patrick F. Maroney and Cassandra R. Cole, Consumer Choice in Auto Repair: The Politics and Economics of Automobile Insurance Repair Practices, Sep. 2010, National Association of Mutual Insurance companies, web, 2-24 (Year: 2010)

* cited by examiner

VINChain 900

| | VIN Number (key) | | | | | | |
|---|---|---|---|---|---|---|---|
| DATA ELEMENT | Owner info | Title status (clean, salvaged, etc.) | Lienholder info / Lien payoff amt | Policy Start Date / Policy End Date | Claim opendate / Claim close date | Build data (vehicle features) | Maintenance/ Repair data | Telematics, odometer data |
| (CREATE/ UPDATE) | Manufacturers Dealerships Body Shops DMVs Insurers Salvage vendors | | Lienholders | Insurers | Insurers | Manufacturers | Body Shops Repair facilities | |
| READ | Manufacturers Dealerships Body Shops DMVs Insurers Salvage vendors Consumers | | Insurers Lienholders Consumers | Insurers Lienholders Consumers | Insurers Consumers | Insurers | Insurers Consumers | Connected cars |
| USE CASE | Title tracking "cradle to grave" | | Claim payment for total loss situation / Auto Refinance | Evidence of insurance | Detecting fraudulent claims | Rating improvements / Improved repair cost estimates | Vehicle history | Claim processing |

*Figure 9*

SYSTEMS AND METHODS FOR ANALYZING VEHICLE SENSOR DATA VIA A BLOCKCHAIN

CROSS-REFERENCE TO RELATED APPLICATIONS

This application claims priority to (1) U.S. Provisional Application No. 62/466,917, entitled "Blockchain Vin Registry," filed Mar. 3, 2017; (2) U.S. Provisional Application No. 62/468,092, entitled "Blockchain Vin Registry," filed Mar. 7, 2017; (3) U.S. Provisional Application No. 62/469,070, entitled "Using a Blockchain for Vehicle Lifecycle Processes," filed Mar. 9, 2017; (4) U.S. Provisional Application No. 62/500,977, entitled "Using a Blockchain for Vehicle Lifecycle Processes," filed May 3, 2017; (5) U.S. Provisional Application No. 62/501,621, entitled "Using a Blockchain for Vehicle Lifecycle Processes," filed May 4, 2017; (6) U.S. Provisional Application No. 62/550,131, entitled "Maintaining a Distributed Ledger for VIN Recordkeeping," filed Aug. 25, 2017; (7) U.S. Provisional Application No. 62/550,140, entitled "Using a Distributed Ledger for Total Loss Management," filed Aug. 25, 2017; (8) U.S. Provisional Application No. 62/550,172, entitled "Using a Distributed Ledger for Tracking VIN Recordkeeping," filed Aug. 25, 2017: (9) U.S. Provisional Application No. 62/550,186, entitled "Smart Contracts for Vehicle Events," filed Aug. 25, 2017; (10) U.S. Provisional Application No. 62/550,197, entitled Using a Distributed Ledger for Tracking Vehicle Financial Events," filed Aug. 25, 2017: (11) U.S. Provisional Application No. 62/550,224, entitled "Using a Distributed Ledger for the Auto claims Process," filed Aug. 25, 2017; (12) U.S. Provisional Application No. 62/550,245, entitled "Using a Distributed Ledger to Track a VIN Lifecycle," filed Aug. 25, 2017; (13) U.S. Provisional Application No. 62/550,261, entitled "Using a Distributed Ledger for Proof of Insurance," filed Aug. 25, 2017, (14) U.S. Provisional Application No. 62/557,359, entitled "Systems and Methods for Updating a Loss History Blockchain," filed Sep. 12, 2017; (15) U.S. Provisional Application No. 62/557,393, entitled "Systems and Methods for Analyzing Vehicle Sensor Data Via a Blockchain," filed Sep. 12, 2017; (16) U.S. Provisional Application No. 62/557,403, entitled "Systems and Methods for Utilizing a Blockchain for Maintaining Vehicle Collision Loss History," filed Sep. 12, 2017; (17) U.S. Provisional Application No. 62/557,415, entitled "Systems and Methods for Utilizing a Blockchain for Maintaining Insured Loss History," filed Sep. 12, 2017; (18) U.S. Provisional Application No. 62/557,433, entitled "Systems and Methods for claim Processing Via Blockchain," filed Sep. 12, 2017; and (19) U.S. Provisional Application No. 62/557,446, entitled "Systems and Methods for Updating an Insured Loss History Blockchain," filed Sep. 12, 2017, each of which is hereby incorporated herein by reference in its entirety.

Additionally, the present application is related to the following co-pending U.S. patent applications: (1) U.S. patent application Ser. No. 15/910,210 entitled "Maintaining a Distributed Ledger for VIN Recordkeeping," filed Mar. 2, 2018; (2) U.S. patent application Ser. No. 15/910,240 entitled "Using a Distributed Ledger for Total Loss Management," filed Mar. 2, 2018; (3) U.S. patent application Ser. No. 15/910,128 entitled "Systems and Methods for Updating a Loss History Blockchain," filed Mar. 2, 2018; (4) U.S. patent application Ser. No. 15/910,141 entitled "Systems and Methods for Analyzing Vehicle Sensor Data via a Blockchain," filed Mar. 2, 2018; (5) U.S. patent application Ser. No. 15/910,150 entitled "Systems and Methods for Utilizing a Blockchain for Maintaining Vehicle Collision Loss History," filed Mar. 2, 2018; (6) U.S. patent application Ser. No. 15/910,162 entitled "Systems and Methods for Utilizing a Blockchain for Maintaining Insured Loss History," filed Mar. 2, 2018; (7) U.S. patent application Ser. No. 15/910,182 entitled "Systems and Methods for claim Processing via Blockchain," filed Mar. 2, 2018; (8) U.S. patent application Ser. No. 15/910,221 entitled "Systems and Methods for Updating an Insured Loss History Blockchain," filed Mar. 2, 2018; (9) U.S. patent application Ser. No. 15/910,260 entitled "Using a Distributed Ledger for Tracking VIN Recordkeeping," filed Mar. 2, 2018; (10) U.S. patent application Ser. No. 15/910,300 entitled "Smart Contracts for Vehicle Events," filed Mar. 2, 2018; (11) U.S. patent application Ser. No. 15/910,324 entitled "Using a Distributed Ledger for Tracking Vehicle Financial Events," filed Mar. 2, 2018; (12) U.S. patent application Ser. No. 15/910,352 entitled "Using a Distributed Ledger for the Auto claims Process," filed Mar. 2, 2018; (13) U.S. patent application Ser. No. 15/910,527 entitled "Using a Distributed Ledger to Track a VIN Lifecycle," filed Mar. 2, 2018; and (14) U.S. patent application Ser. No. 15/910,563 entitled "Using a Distributed Ledger for Proof of Insurance," filed Mar. 2, 2018.

TECHNICAL FIELD

Systems and methods are disclosed with respect to using a blockchain for vehicle lifecycle processes, specifically, an automotive claims process, vehicle loss history, and the lifecycle of a vehicle identification number.

BACKGROUND

Vehicles undergo a variety of information exchange periods during their lifecycle. Some of these information exchange periods are brought on by accidents, sales, or the eventual destruction of the vehicle. Managing the vehicle life cycle process involves multiple participants exchanging a variety of information. The number of interactions between these parties means the parties have to provide and validate information. Theses interactions often occur between businesses and consumers, or businesses and other businesses. However, using conventional techniques, managing the vehicle life cycle may include several drawbacks.

SUMMARY

The present embodiments may be related to a Blockchain Registry based upon a VIN (Vehicle Identification Number) or other asset identifier, an insured identifier, and/or an insurance-related identifier. A national or other registry of automobile VIN numbers may be commonly accessed and/or updated by organizations, such as auto manufacturers, insurance carriers, financial institutions, fleet owners, banks, body shops, part suppliers, State Departments of Motor Vehicles (DMVs), and/or salvage vendors. The Blockchain Registry, utilizing blockchain technology, may be a single, historical, authoritative source for multiple pieces of information about each vehicle and/or individual that is accessed, tracked, and updated using Vehicle Identification Numbers (VINs) and/or insured identifiers (such as a social security number or an insurance policy number).

The Blockchain Registry may have various usages, and may allow for the introduction of new capabilities into current processes. Examples of such usage include: (1)

validating proof of insurance on a vehicle (available to law enforcement, lienholders, vehicle owners, etc.); (2) tracking vehicle ownership from "cradle to grave," via seamless title transfers between manufacturers, dealers, consumers, salvage yard, etc.; (3) identifying the current lienholder of a vehicle, and the current lien payoff amount (e.g., for more frictionless processing of payment such as in a total loss situation, or for loan refinancing situations); (4) ensuring lien perfection (e.g., title reflects joint ownership by person and lienholder); (5) reducing fraud by detecting duplicate coverage or duplicate claims for a single vehicle, or detecting buildup or questionable claims; (6) tracking maintenance or repair work that has been, or is to be, performed on a vehicle; (7) when coupled with crash detection, performing first notification of loss to the appropriate insurer; (8) in conjunction with connected car capabilities, limiting the vehicle's capabilities if the vehicle isn't registered properly, lacks insurance coverage, or the owner is behind on loan payments; (9) connected license plates, reflecting the current registration status; (10) facilitating Usage-Based Insurance (UBI) or trip-based insurance; (11) recording all OEM features, part numbers, (autonomous or other vehicle) system or software of versions of the vehicle (beyond what can derived from the VIN, make, and model information), i.e., the vehicle build; (12) more accurate insurance rating based upon known security or safety features of a vehicle (which may impact either a human driven vehicle, or a semi-autonomous or autonomous vehicle or technology, or both); (13) more accurate repair cost estimations based upon known vehicle features (which may impact human driving, or vehicle self-driving); and/or (14) facilitating recall notifications in a prompt and reliable manner.

Potential blockchain participants may include auto manufacturers, insurance carriers, consumers, individual vehicle owners, fleet owners, salvage vendors, auditors, State DMVs, auto dealerships, banks or credit unions, lienholders, body shops, repair facilities, tow truck operations, part supplies, rental companies, and/or law enforcement.

Potential data elements included in the blockchain and/or each blockchain transaction, block, or update may include vehicle VIN number and/or insured identifiers and one or more additional data elements associated with that particular vehicle and/or insured. The additional data elements may include owner and/or insured information, such as owner type (manufacturer, dealer, consumer, lienholder, etc.); owner ID (EIN, SSN, etc.); owner name; and/or owner contact information (address, phone, email address, etc.). The additional data elements may include insurance carrier information, such as insurer name; insurance policy ID or number; an indication of whether the policy remains in force (Y/N?); effective dates of the policy; expiration date of the insurance coverage; and/or insurance policy coverages, terms, limits, deductibles, conditions, etc.

The additional data elements may include lienholder information, such as lienholder name; lienholder contact information; whether the loan is in good standing (Y/N?); and/or current payoff amount. The additional data elements may include a license plate number; state of issuance; and whether the vehicle registration with the state DMV is up-to-date. The additional data elements may include an indication of any claims made; including date of first notice of loss; insurance carrier that the claim was filed with; claim open date; claim close date; an amount of the claim; and whether or not the claim was resolved. The additional data elements may include information on maintenance or repair events, including event type; event date; event cost; and/or one or more locations associated with the event (e.g., city and state of event location).

The Blockchain Registry may be used in conjunction with smart contracts that govern the vehicles, including autonomous or semi-autonomous vehicles. For instance, the smart contracts may related to maintenance, warranties, vehicle loans, service contracts, UBI, trip-insurance, auto insurance policies, vehicle titles, vehicle salvage, total loss vehicles, etc. When an event or data relevant to a vehicle or a smart contract is generated, a transaction associated with the vehicle's VIN and/or insured identifier and may be generated and compiled into a block of a distributed ledger (or Blockchain Registry). The transaction or update to the distributed ledger or Blockchain Registry may include (i) the vehicle's VIN and/or insured identifier, and (ii) one or more additional data elements associated with the vehicle and/or insured, including the additional data elements mentioned elsewhere herein.

In one aspect, a computer-implemented method of utilizing blockchain technology to maintain a loss history blockchain after vehicle collisions based upon vehicle sensor data may be provided. The method may include (1) receiving, via one or more processors and/or associated transceivers (such as via wireless communication or data transmission over one or more radio links), an indication of vehicle being involved a vehicle collision and a vehicle VIN; (2) accessing, at a memory, a loss history blockchain associated with the vehicle using the VIN as a key; (3) receiving, via the one or more processors and/or associated transceivers, vehicle sensor data generated or collected prior to, during, and/or after the vehicle collision; (4) creating, via the one or more processors, a block to add to the loss history blockchain that includes the vehicle sensor data, or otherwise updating the loss history blockchain with the vehicle sensor data associated with the vehicle collision; (5) analyzing, via the one or more processors, the vehicle sensor data to reconstruct the vehicle collision; and/or (6) updating, via the one or more processors, the loss history blockchain to include and/or indicate the reconstructed vehicle collision by including the created block. The method may include additional, less, or alternate functionality, including that discussed elsewhere herein.

In another aspect, a system for utilizing blockchain technology to maintain a loss history blockchain after vehicle collisions based upon vehicle sensor data may be provided. The system may include (i) a network interface configured to interface with a processor; (ii) a memory configured to store non-transitory computer executable instructions and configured to interface with the processor; and/or (iii) the processor configured to interface with the memory. The processor may be configured to execute the non-transitory computer executable instructions to cause the system to (1) receive an indication of vehicle being involved a vehicle collision and a vehicle VIN; (2) access a loss history blockchain associated with the vehicle using the VIN as a key; (3) receive vehicle sensor data generated or collected prior to, during, and/or after the vehicle collision; (4) create a block to add to the loss history blockchain that includes the vehicle sensor data, or otherwise update the loss history blockchain with the vehicle sensor data associated with the vehicle collision; (5) analyze the vehicle sensor data to reconstruct the vehicle collision; and/or (6) update the loss history blockchain to include and/or indicate the reconstructed vehicle collision by including the created block. The system may include additional, less, or alternate functionality, including that discussed elsewhere herein.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein:

FIG. 9 depicts an exemplary flow diagram associated with one aspect of the present disclosure;

Figure 1A:
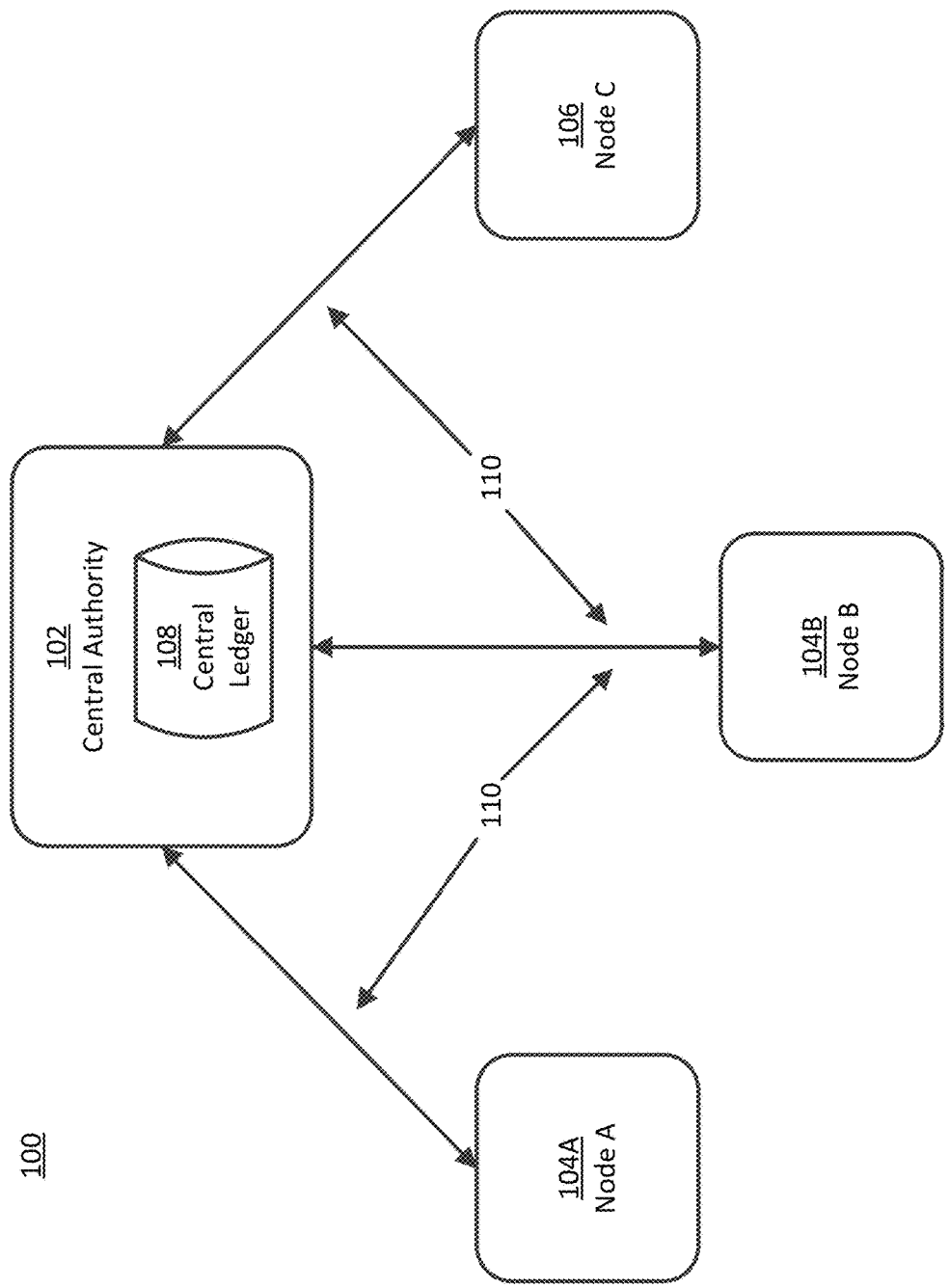
FIG. 1A depicts an exemplary database system, in accordance with one aspect of the present disclosure.

The figures depict aspects of the present embodiments for purposes of illustration only. One skilled in the art will readily recognize from the following discussion that alternate aspects of the structures and methods illustrated herein may be employed without departing from the principles of the invention described herein.

DETAILED DESCRIPTION

The present embodiments relate to, inter alia, systems and methods for using a blockchain to record information related to processes and services in the automotive industry. For example, a blockchain may be used to manage the automotive claims process, a vehicle's loss history, and the lifecycle of a vehicle identification number. The systems and methods described herein allow for using a blockchain which gives the option for private information, and permissioned participants in the blockchain. In particular, the systems and methods allow for a distributed consensus amongst businesses, consumers, and authorities, as to the validity of information and transactions stored on the blockchain.

Some exemplary, but not limiting, applications that may take advantage of the disclosed systems and methods relate to problems surrounding the automotive claims process, vehicle loss history, and the lifecycle of a vehicle identification number. Specifically, such applications may be: processing automotive insurance claims, tracking a vehicle's loss history, tracking a vehicle identification number over the course of the vehicle's life, transferring a vehicle title in a total loss scenario, subrogation transactions related to a vehicle accident, transferring a vehicle title, executing and processing travel insurance, interacting with original equipment manufacturers for a vehicle, and tracking information from the national insurance crime bureau.

The above listed examples, and disclosed systems and methods, may use an application of distributed ledgers, where each new block may be cryptographically linked to the previous block in order to form a "blockchain."

A blockchain is a way of achieving a distributed consensus on the validity or invalidity of information. As opposed to using a central authority, a blockchain is a distributed database, or ledger, in which a transactional record is maintained at each node of a peer to peer network. Commonly, the distributed ledger is comprised of groupings of transactions bundled together into a "block." When a change to the distributed ledger is made (e.g., when a new transaction and/or block is created), each node must form a consensus as to how the change is integrated into the distributed ledger. Upon consensus, the agreed upon change is pushed out to each node so that each node maintains an identical copy of the updated distributed ledger. Any change that does not achieve a consensus is ignored. Accordingly, unlike a traditional system which uses a central authority, a single party cannot unilaterally alter the distributed ledger. This inability to modify past transactions lead to blockchains being generally described as trusted, secure, and immutable.

Some blockchains may be deployed in an open, decentralized, and permissionless manner meaning that any party may view information, submit new information, or join the blockchain as a node responsible for confirming information. This open, decentralized, and permissionless approach to a blockchain has limitations. As an example, these blockchains may not be good candidates for interactions that require information to be kept private, such as information related to a vehicle lifecycle process, or for interactions that require all participants to be vetted prior to their participation.

In any event, to create a new block, each transaction within a block may be assigned a hash value (i.e., an output of a cryptographic hash function, such as SHA-256 or MD5). These hash values may then be combined together utilizing data storage and cryptographic techniques (e.g., a Merkle Tree) to generate a hash value representative of the entire new block, and consequently the transactions stored in the block. This hash value may then be combined with the hash value of the previous block to form a hash value included in the header of the new block, thereby cryptographically linking the new block to the blockchain. To this end, the precise value utilized in the header of the new block may be dependent on the hash value for each transaction in the new block, as well as the hash value for each transaction in every prior block.

According to certain aspects disclosed herein, information stored in blockchains can be trusted, because the hash value generated for the new block and a nonce value (an arbitrary number used once) are used as inputs into a cryptographic puzzle. The cryptographic puzzle may have a difficulty set by the nodes connected to the blockchain network, or the difficulty may be set by administrators of the blockchain network. In one example of the cryptographic puzzle, a solving node uses the hash value generated for the new block and repeatedly changes the value of the nonce until a solution for the puzzle is found. For example, finding the solution to the cryptographic puzzle may involve finding the nonce value that meets certain criteria (e.g., the nonce value begins with five zeros).

When a solution to the cryptographic puzzle is found, the solving node publishes the solution and the other nodes then verify that the solution is valid. Since the solution depends on the particular hash values for each transaction within the blockchain, if the solving node attempted to modify any transaction stored in the blockchain, the solution would not be verified by the other nodes. More specifically, if a single node attempts to modify a prior transaction within the blockchain, a cascade of different hash values may be generated for each tier of the cryptographic combination technique. This results in the header for one or more blocks being different than the corresponding header(s) in every other node that did not make the exact same modification.

Exemplary Database & Distributed Ledger

FIG. 1A depicts an exemplary database system 100 in accordance with one aspect of the present disclosure. FIG. 1A includes a central authority 102, a plurality of nodes 104A, 104B, and 106, a central ledger 108, and a plurality of network connections 110. In one exemplary operation of the database system 100, one of the nodes, for example Node A 104A, would issue a request to the central authority 102 to perform an action on data stored in the central ledger 108. This request may be a request to create, read, update, or delete data that is stored in the central ledger 108.

The central authority 102 would receive the request, processes the request, make any necessary changes to the data stored in the central ledger 108, and inform the requesting node, Node A 104A, of the status of the request. The central authority 102 may also send out status updates to the other nodes on the network about the change made, if any, to the data by Node A 104A. In the database system 100, all interaction with the data stored in the central ledger 108 occurs through the central authority 102. In this way, the central authority functions as a gatekeeper of the data.

Accordingly, the central authority 102 may operate as a single point of entry for interacting with the data, and consequently the central authority 102 is a single point of failure for the entire database system 100. As such, if the central authority 102 is not accessible to the nodes in the database system 100, then the data stored in the central ledger 108 is not accessible. In another example, each individual node may keep their own databases and then at the end of the day each node sends a copy of their database to the central authority 102 where the received databases are reconciled to form a single cohesive record of the data stored in the central ledger 108.

Figure 1B:
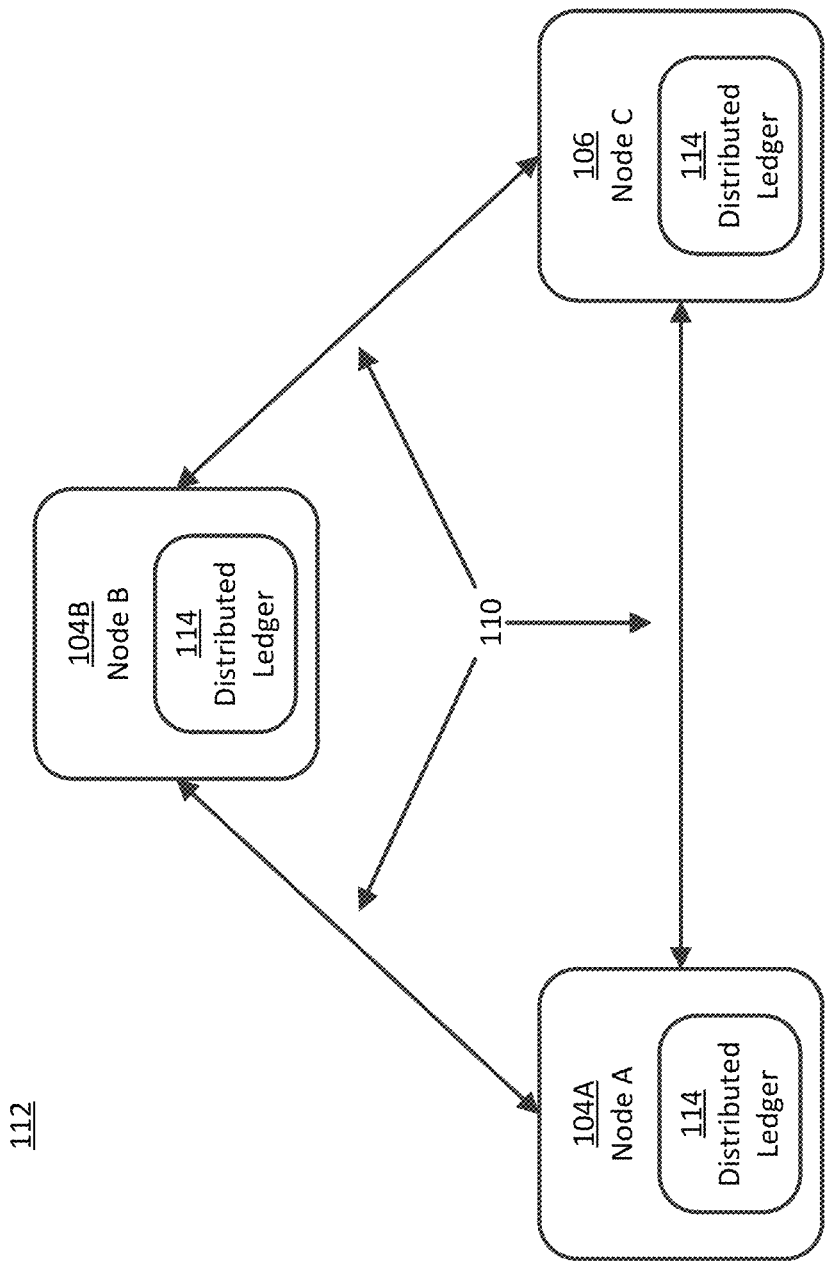
FIG. 1B depicts an exemplary distributed ledger system, in accordance with one aspect of the present disclosure.

Conversely, FIG. 1B depicts an exemplary distributed ledger system 112 in accordance with one aspect of the present disclosure. An example of a distributed ledger system 112 is the blockchain system described above. FIG. 1B includes a plurality of nodes 104A, 104B, and 106, a distributed ledger 114, and network connections 110. In a distributed ledger system 112, each node keeps a copy of the distributed ledger 114. As changes are made to the distributed ledger 114 each node updates their copy of the distributed ledger 114. A consensus mechanism may be used by the nodes in the distributed ledger system 112 to decide when it is appropriate to make changes to the distributed ledger 114.

Therefore, each node has their own copy of the distributed ledger 114, which is identical to every other copy of the distributed ledger 114 stored by each other node. The distributed ledger system 112 is more robust than a central authority database system, because the distributed ledger system 112 is decentralized and there is no single point of failure.

Exemplary Transaction Flow & Block Propagation Flow

Figure 2A:
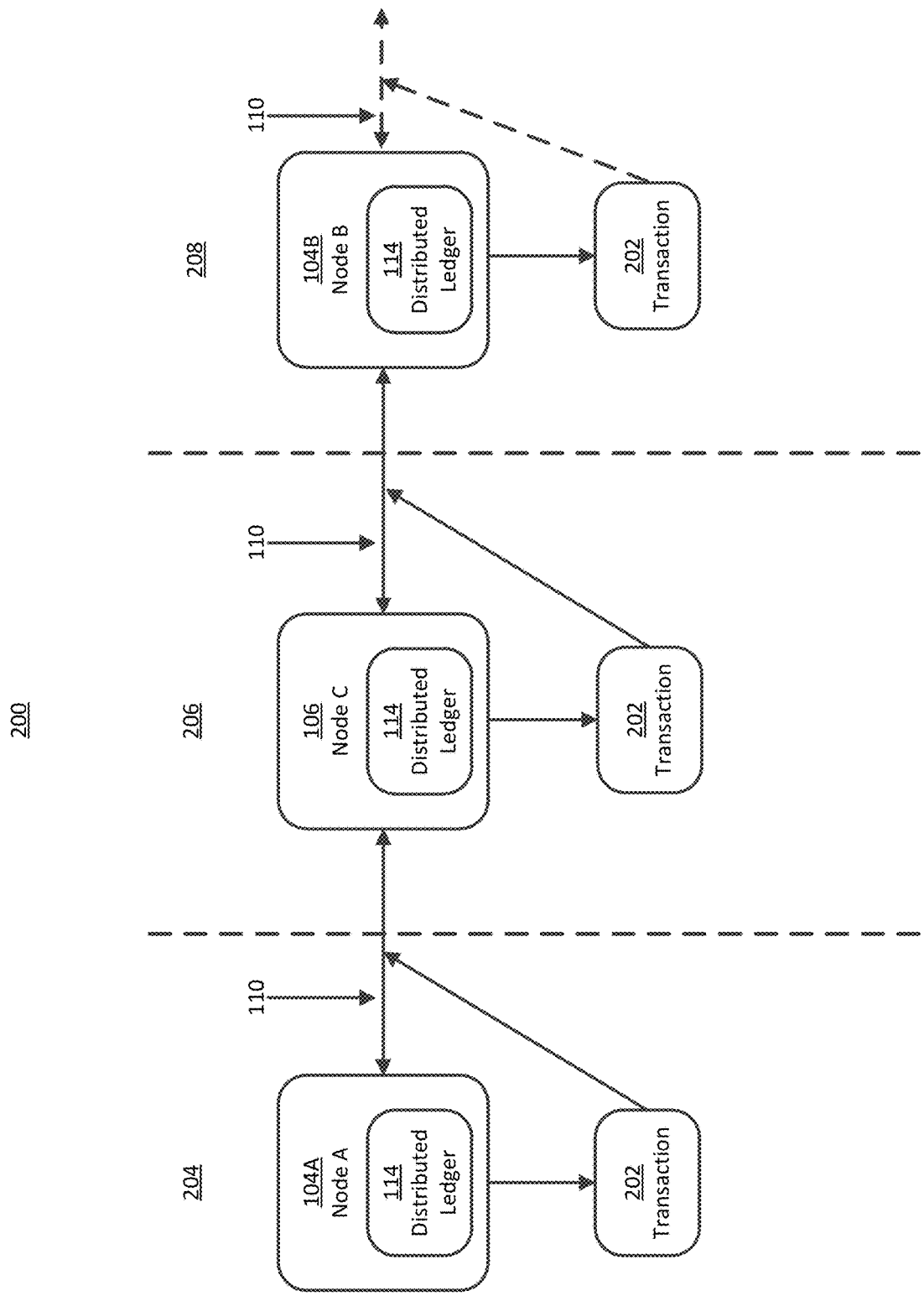
FIG. 2A depicts an exemplary transaction flow, in accordance with one aspect of the present disclosure.

FIG. 2A depicts an exemplary transaction flow 200 in accordance with one aspect of the present disclosure. FIG. 2A includes a transaction 202, three different time frames 204, 206, and 208, a set of nodes, network connections 110, and a distributed ledger 114. The transaction flow 200 may represent a sequential flow of a transaction through a network, such as the network depicted in FIG. 1B. For example, at time 204 Node A 104A generates a transaction 202 or event.

The transaction 202 may use data that is stored in the distributed ledger 114, or the transaction 202 may use data received by the node from outside the distributed ledger 114. Node A 104A may transmit the newly generated transaction to Node C 106 via the network connection 110. At time 206, Node C 106 receives the transaction 202, and confirms that the information contained therein is correct. If the information contained in the transaction 202 is not correct Node C 106 may reject the transaction, and not propagate the transaction 202 through the system. If the information contained in the transaction 202 is correct Node C 106 may transmit the transaction 202 to its neighbor Node B 104B.

Similarly, at time 208 Node B 104B may receive the transaction 202 and either confirm or reject the transaction 202. In some embodiments, the Node B 104B may not transmit the confirmed transaction 202, because there are no further nodes to transmit to, or all the nodes in the network have already received transaction 202.

In some embodiments, at any of time frames 204, 206, or 208, any of the nodes may add the confirmed transaction 202 to their copy of the distributed ledger 114, or to a block of transactions stored in the distributed ledger. In some embodiments, confirming the transaction 202 includes checking cryptographic key-pairs for participants involved in the transaction 202. Checking the cryptographic key-pairs may follow a method laid out by a consensus protocol, such as the consensus protocol discussed in FIG. 1B.

Figure 2B:
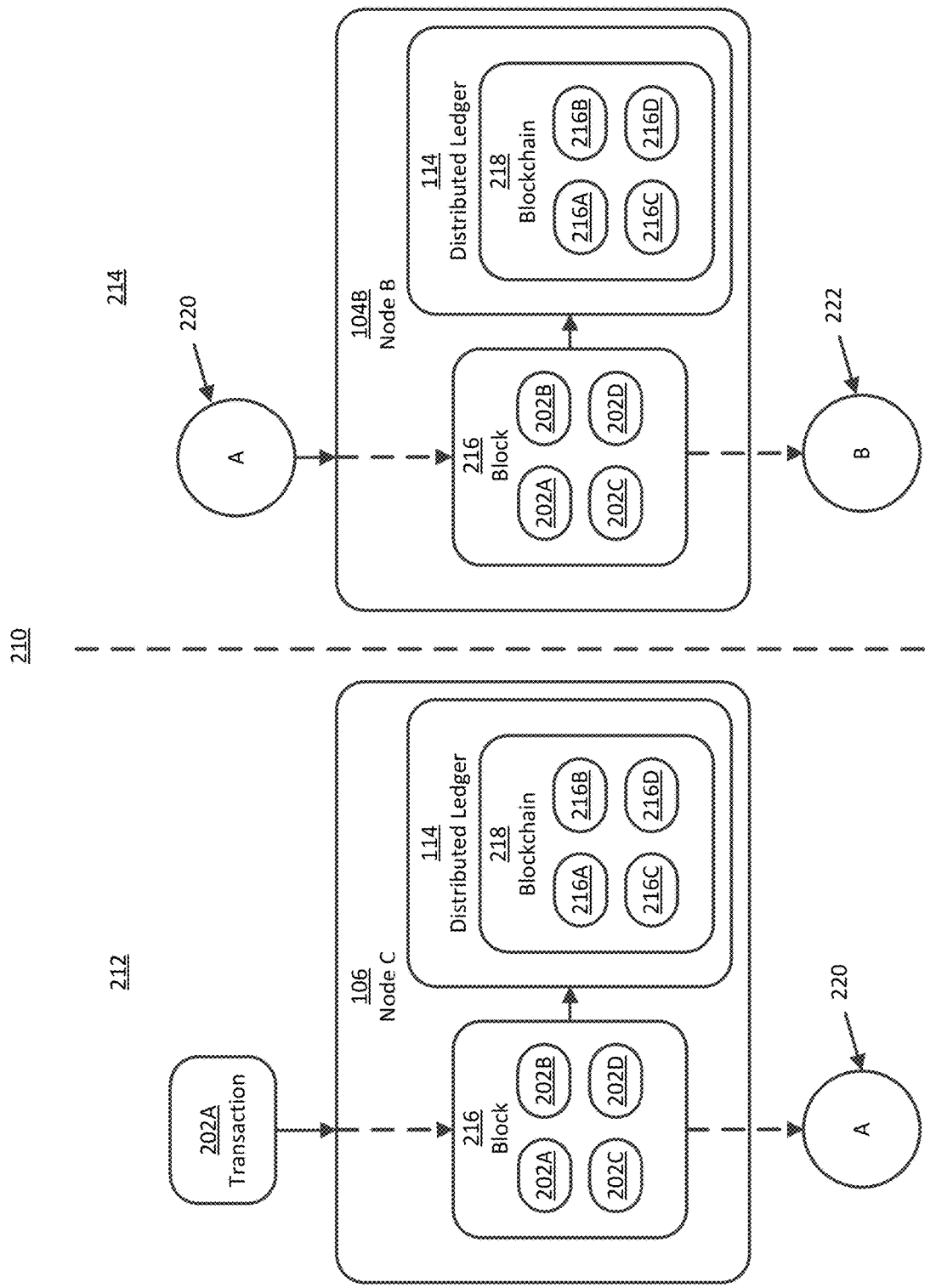
FIG. 2B depicts an exemplary block propagation flow, in accordance with one aspect of the present disclosure.

FIG. 2B depicts an exemplary block propagation flow 210 in accordance with one aspect of the present disclosure. FIG. 2B includes two time frames 212 and 214, Node C 106 and Node B 104B, a set of transactions 202A-202D, a set of blocks of transactions 216A-216D, a distributed ledger 114, and a blockchain 218. The block propagation flow 210 may follow the blockchain system described above, or may follow another blockchain propagation algorithm.

The block propagation flow 210 may begin with Node C 106 receiving transaction 202A at time 212. When Node C 106C confirms that transaction 202A is valid, the node may add the transaction to a newly generated block 216. As part of adding the transaction 202A to block 216, Node C 106 may solve a cryptographic puzzle and include the solution in the newly generated block 216 as proof of the work done to generate the block 216. This proof of work may be similar to the proof of work described above which utilizes guessing a nonce value. In other embodiments, the transaction 202A may be added to a pool of transactions until enough transactions exist to form a block. Node C 106 may transmit the newly created block 216 to the network at 220. Before or after propagating the block 216, Node C 106 may add the block 216 to its copy of the blockchain 218.

At time 214 Node B 104B may receive the newly created block 216. Node B 104B may verify that the block of transactions 216 is valid by checking the solution to the cryptographic puzzle provided in the block 216. If the solution is accurate then Node B 104B may add the block 216 to its blockchain 218 and transmit the block 216 to the rest of the network at 222.

In one embodiment, one or more transactions 202 or events may relate to smart contracts associated with the vehicle or a VIN (Vehicle Identification Number), or vehicle owner or driver. The smart contracts may relate to vehicle financing, vehicle ownership, vehicle title and registration, vehicle maintenance or repair, and other vehicle-related events or transactions.

For example, a smart contract may be stored on the blockchain 218. The smart contract may include terms of a contract for vehicle financing, the payor and payee of the contract, actions to be performed related to the contract, and any other related items to the contract. The smart contract may be found on the blockchain 218 via the vehicle identifier. As transactions 202 are received information contained in the transaction may indicate that a payment for the vehicle financing has been made, and accordingly the smart contract may be updated to reflect this payment, and potentially trigger other actions to occur, such as notifying the lender. These actions, and terms, are stored in the smart contract on the blockchain 218, and may be visible to the parties to the vehicle financing, to all the participants in the blockchain 218, or to only some participants in the blockchain 218.

Exemplary Sequence Diagram

Figure 3:
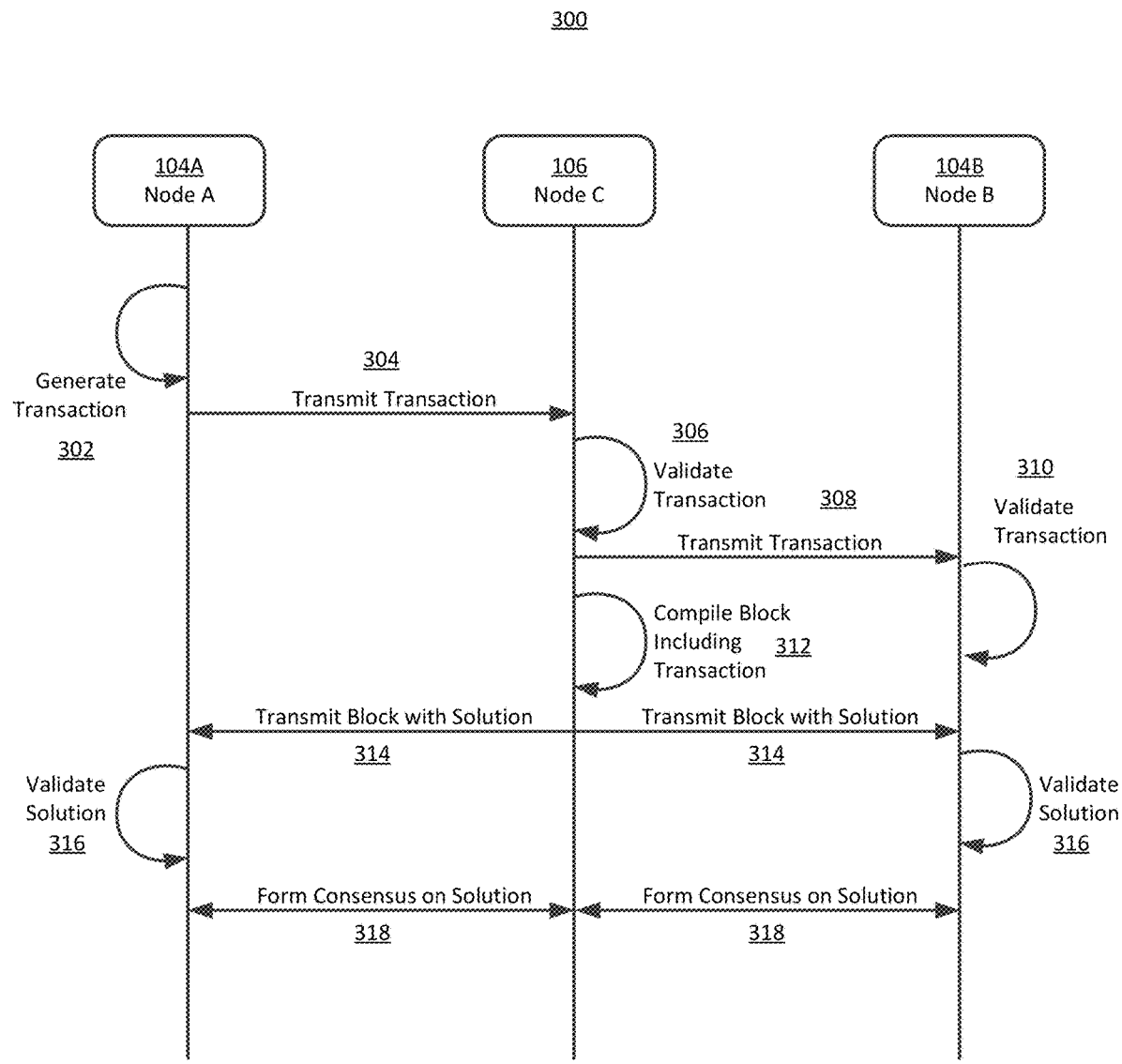
FIG. 3 depicts an exemplary sequence diagram, in accordance with one aspect of the present disclosure.

FIG. 3 depicts an exemplary sequence diagram 300 in accordance with one aspect of the present disclosure. FIG. 3 includes a set of nodes 104A, 104B, and 106. At 302, Node A 104A may generate a transaction. The transaction may be transmitted from Node A 104A to Node C 106 at 304. Node C 106 may validate the transaction at 306, and if the transaction is valid, transmit the transaction at 308 to Node B 104B. Node B 104B may validate the transaction at 310. At 312, Node C 106 may compile a block including the validated transaction. Compiling a block may include generating a solution to a cryptographic puzzle, and linking the block to other blocks, as described in the embodiments above. Once the block is compiled, Node C 106 may transmit the block with the solution at 314 to both Node A 104A and Node B 104B.

Both nodes may then validate the solution to the block at 316. Verifying may include checking a cryptographic keypair as described above. At 318 the three nodes form a consensus that the solution is valid, and accordingly all the nodes have formed a consensus on the blocks of transactions stored by all the nodes.

Exemplary Node

Figure 4:
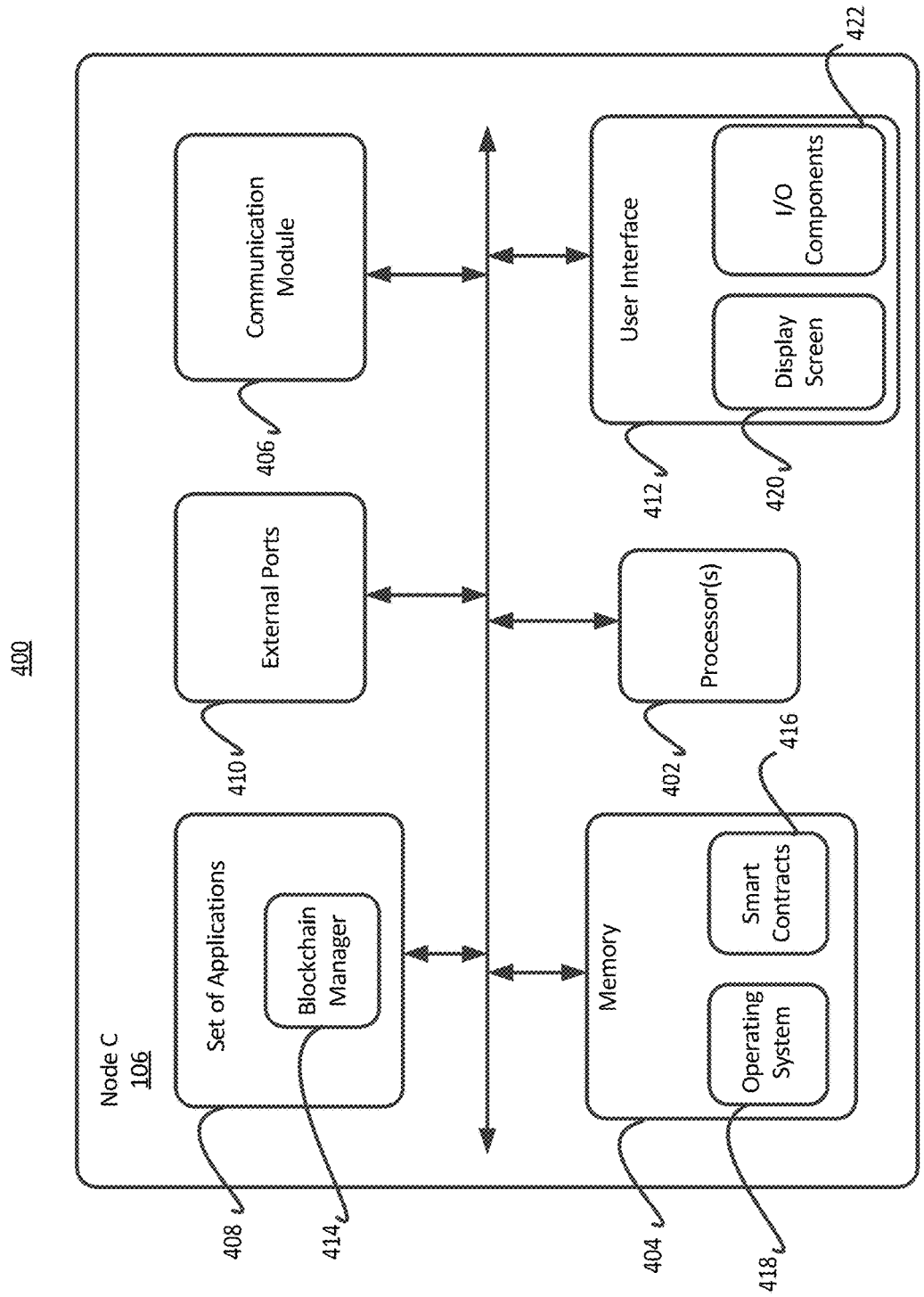
FIG. 4 depicts an exemplary node, in accordance with one aspect of the present disclosure.

FIG. 4 depicts an exemplary node 400 in accordance with one aspect of the present disclosure. In some embodiments, node 400 may be the same type of node as Node C 106 in FIGS. 1A-3. In other embodiments, node 400 may be the same type of node as Node A 104A and Node B 104B in FIGS. 1A-3. Node 400 may be capable of performing all the embodiments disclosed herein. In particular, node 400 may utilize the decentralized system described in FIG. 1B, the flows of transactions and blocks described in FIGS. 2A and 2B, and the blockchain system 500 described below in FIG. 5.

FIG. 4 may include at least one processor 402, memory 404, a communication module 406, a set of applications 408, external ports 410, user interface 412, a blockchain manager 414, smart contracts 416, operating system 418, a display screen 420, and input/output components 422. In some embodiments, the node 400 may generate a new block of transactions by using the blockchain manager 414. Similarly, the node 400 may use the blockchain manager 414 in conjunction with the smart contracts 416 stored in memory 404 to execute the functionality disclosed herein. In general, the smart contracts 416 include code that is shared with all, or some, of the participants in the blockchain network in which the node 400 participates. This code may be used to ensure transparency in transactions, agreements, and other events that are recorded on the blockchain.

In other embodiments, the smart contracts 416 operate independent of the blockchain manager 414 or other applications. In some embodiments, node 400 does not have a blockchain manager 414, or smart contracts 416 stored at the node. In some embodiments, the node 400 may have additional or less components than what is described. The components of the node 400 are described in more detail below.

The node 400, as part of a decentralized ledger system 112, or another decentralized or centralized network, may be used to handle systems that interact with and manipulate data and transactions designed for the automotive claims process, a vehicle loss history, and the lifecycle of a vehicle identification number.

Exemplary Blockchain System

Figure 5:
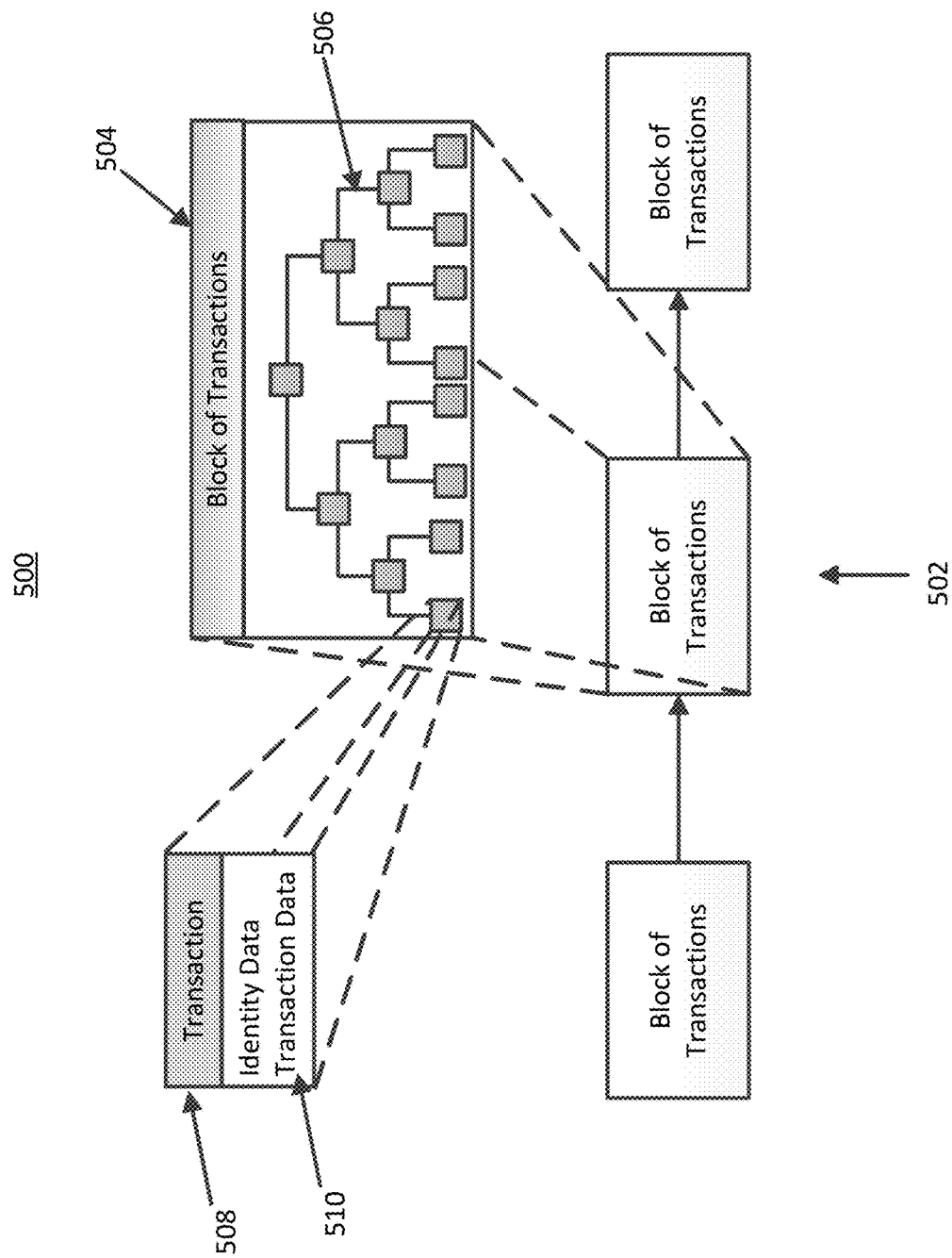
FIG. 5 depicts an exemplary blockchain, in accordance with one aspect of the present disclosure.

FIG. 5 depicts an exemplary blockchain system 500 in accordance with one aspect of the present disclosure. FIG. 5 includes a blockchain 502, a block of transactions 504, a Merkle Tree 506, and a transaction 508. The Merkle Tree may be the same Merkle Tree referred to above that cryptographically links transactions together. In other embodiments, the blockchain system 500 may utilize a different method of organizing transactions in a block. In some embodiments, the blockchain system 500 includes a plurality of blocks connected together to form a chain of blocks of transactions 502.

Each block of transactions 504 may include at least one transaction 508. In other embodiments, each block of transactions 504 has a size limit that necessarily limits the number of transactions that the block may store. Each block of transactions 504 includes a reference to a previous block of transactions that was added to the blockchain 502 prior to the block of transactions 504 being added to the blockchain 502. As such, and as described above, each block of transactions 504 is linked to every other block in the blockchain 502.

In some embodiments, the block of transactions 504 may organize the transactions it has received into a Merkle Tree 506 to facilitate access to the stored transactions. The transactions may be hashed using a cryptographic hash algorithm, such as the algorithms discussed above, and the hash of each transaction is stored in the tree. As the tree is constructed the hash of each adjacent node at the same level is hashed together to create a new node that exists at a higher level in the tree. Therefore, the root of the tree, or the node at the top of the tree, is dependent upon the hash of each transaction stored below in the tree. Each transaction 508 may include a set of data 510. The set of data 510 may include identifying data for the transaction, and transaction data identifying the nature of the transaction and what the transactions entails.

Reporting and Tracking the Auto Claim Process

In one embodiment, reporting and tracking events related to an automotive claims process is conducted on a blockchain. The automotive insurance claims process may involve the following parties: a vehicle owner, an insurer, a repair facility, a parts supplier, a logistics provider, and a rental provider. Presently, the process involves a considerable amount of communication, and coordination back and forth between all of the relevant parties listed above. As such, the process can be time consuming, and there are difficulties ensuring the correct information is received by the correct party at the correct time. By instituting the process on a blockchain significant time and resource improvements can be obtained.

After a vehicle owner is in an accident, the claims process typically begins when the insurer receives a loss report for the vehicle. The insurer determines coverage based upon the loss report, triages the vehicle, and sends a repair assignment to a repair facility. Optionally, the insurer may assign a rental vehicle to the vehicle owner if applicable. The rental provider provides the rental vehicle accordingly. Throughout the process, the vehicle owner provides authorization to repair the vehicle, and pay for such repairs, and pays a deductible.

At some point a repair facility takes control of the vehicle. In some cases the repair facility may provide a rental car, or substitute transportation to the vehicle owner. The repair facility secures authorization to repair the vehicle from the vehicle owner. Once this is secured, the repair facility identifies potential areas of prior damage/betterment, develops a repair plan, and prepares a repair estimate. The repair facility may request parts from suppliers, finalize any parts orders, update the estimate accordingly, and generally manage the repair of the vehicle. As part of the repair process, the repair facility may provide photographic evidence of the damage done to the vehicle. These photographs may then be uploaded to the blockchain after they have been hashed so as to ensure that any private information is protected, but also that the photographs provided are valid.

The insurer is largely responsible for determining the coverage, coordinating with the repair facility and rental provider, and for communicating with the vehicle owner. Additionally, in some embodiments the insurer may be a provider of the network on which the blockchain to manage the process is stored, or may be a participant on the network.

All of the participants in the network may be responsible for verifying information that is stored on the blockchain, and providing additional information to the blockchain to facilitate the auto claims process. Some of the participants may function as nodes that compile transactions into blocks that are then added to the network, but not all participants need be nodes that compile transactions into blocks.

In one exemplary embodiment, the systems and methods disclosed may be used by a participant to receive a vehicle loss report, notification and/or other indication that a vehicle is involved in a collision, access a block stored on a blockchain to determine if information for the vehicle corresponding to the vehicle loss report is stored on the blockchain, analyze the received vehicle identifier notification, perform any necessary changes to information stored on the blockchain related to the vehicle and/or the vehicle loss report, and transmit the block where the vehicle information is stored, or a vehicle loss report is stored, to another participant on the network. In some embodiments, the indication that the vehicle was involved in the collision may be received as part of an insurance claim. In some cases, updating and transmitting the block includes creating a new block with relevant information that will be added to the blockchain. In some embodiments, a node, such as the node 400 depicted in FIG. 4, may be the recipient of the vehicle loss report, and the node may be a part of a distributed ledger system, such as the system 112 of FIG. 1B. In some embodiments, a graphical user interface may be used to ensure that a user, or participant, may interact with the data presented, and more easily track the relevant data as it progresses through its process and is stored on the blockchain. Additionally, as part of the process any relevant title information, or any liens that are held against the vehicle, may be a part of the process.

Figure 6:
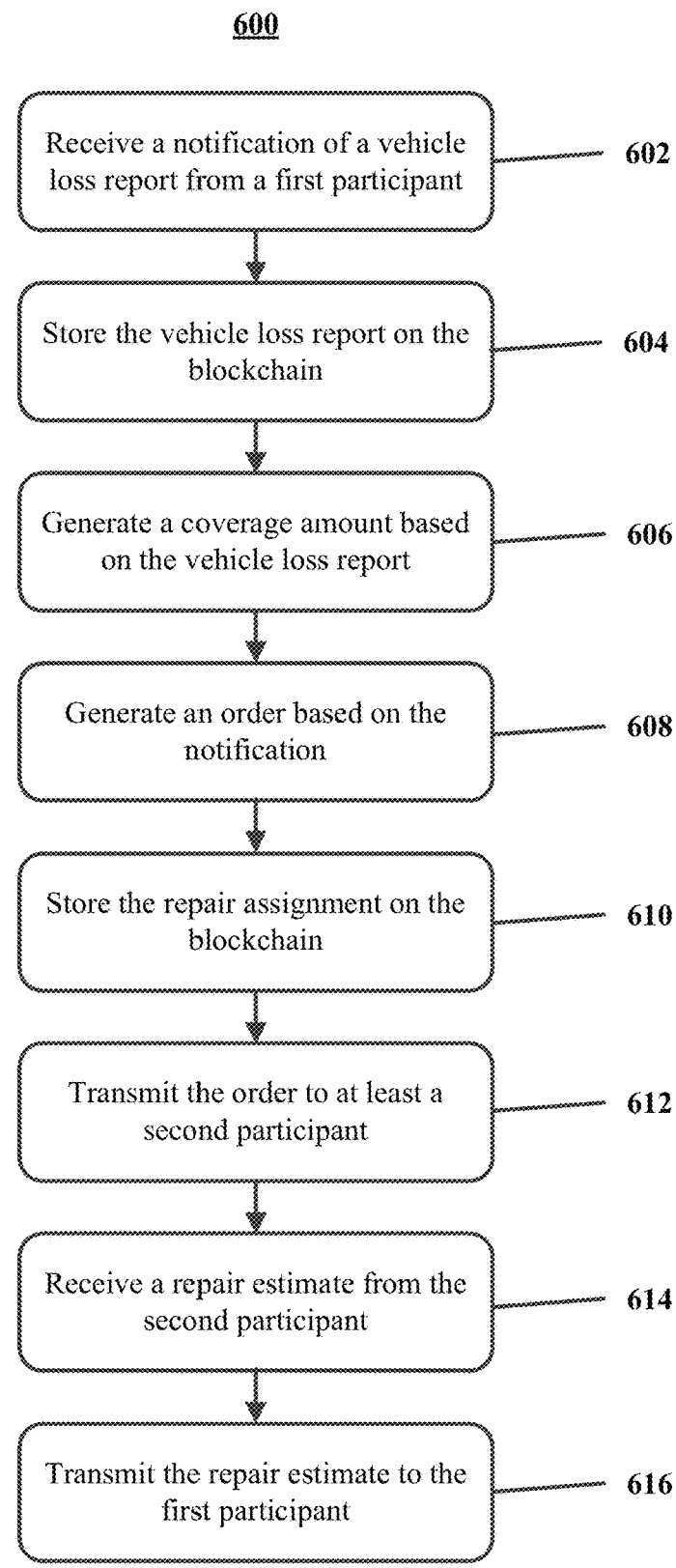
FIG. 6 depicts an exemplary flow diagram associated with one aspect of the present disclosure.

Exemplary Computer-Implemented Method for Reporting and Tracking the Auto Claim Process FIG. 6 depicts an exemplary flow diagram 600 associated with one aspect of the present disclosure, in particular, using a blockchain for reporting and tracking events related to an automotive claims process among a network of participants. In some embodiments, the network of participants may be the nodes described above, for example, node 400 depicted in FIG. 4. The blockchain used by the participants may be the blockchain 500 depicted in FIG. 5, whose operation is described in FIGS. 2A, 2B, and 5. The steps of the computer-implemented method 600 may be performed by the nodes in the network of participants, such as the nodes described in FIGS. 1A-4. The method 600 may include additional, fewer, or alternative actions, including those described elsewhere herein.

The method 600 for reporting and tracking events related to an automotive claims process on a blockchain reported and tracked by a plurality of participants in the blockchain network may include (1) receiving, at a processor, a notification of a vehicle loss report from a first participant (602); (2) storing, at a memory coupled with the processor, the vehicle loss report on the blockchain (block 604); (3) generating, at the processor, a coverage amount based upon the vehicle loss report (block 606); (4) generating, at the processor, an order based upon the notification, wherein the order includes a repair assignment and a replacement vehicle request (block 608); (5) storing, at the memory, the repair assignment on the blockchain (610); (6) transmitting, at the processor, the order to at least a second participant (block 612); (7) receiving, at the processor, a repair estimate from the second participant (block 614); and/or (8) transmitting, at the processor, the repair estimate and the coverage amount to the first participant (block 616).

In some embodiments, the first participant is the vehicle owner, and in other embodiments the second participant is a repair facility. In other embodiments, both the first participant is the vehicle owner and the second participant is a repair facility.

In some embodiments, the method may further include receiving, at the processor, a repair approval from the first participant, transmitting, at the processor, the repair approval to the second participant, and/or storing, at the memory, the repair approval on the blockchain. Alternatively, the computer implemented method may further include transmitting, at the processor, the order to a third participant, wherein the third participant is a rental provider; receiving, at the processor, a rental bill from the third participant; and/or storing, at the memory, the rental bill on the blockchain.

In yet other embodiments, prior to receiving the repair estimate, the method may include receiving, at the processor, a parts delivery notification from a fourth participant, wherein the fourth participant is a parts supplier; and storing, at the memory, the parts delivery notification on the blockchain. Similarly, in some embodiments, prior to receiving the repair approval, receiving, at the processor, a parts delivery confirmation from a fifth participant, wherein the fifth participant is a logistics provider; and/or storing, at the memory, the parts delivery confirmation on the blockchain.

In some embodiments, the method may include receiving, at the processor, a final repair bill from the second participant; and storing, at the memory, the final repair bill on the blockchain. Additionally, in some embodiments the method may include, wherein if items are stored on the blockchain, updating, at the memory, a copy of the blockchain stored at the memory; and/or transmitting, via the network interface, the updated copy of the blockchain to at least one other participant. Similarly, some embodiments include receiving, at the processor, a repair rejection from the first participant; transmitting, at the processor, the repair rejection to the second participant; and/or storing, at the memory, the repair rejection on the blockchain.

In some embodiments, the vehicle loss report may be used to access the blockchain and identify a smart contract associated with the vehicle. The vehicle loss report may be used to update the smart contract using information included in the vehicle loss report.

Vehicle Loss History

In one embodiment, reporting and tracking events related to a vehicle loss history, are stored on a blockchain maintained by a plurality of participants. The vehicle loss history may include information on the following parties: a vehicle owner, an insurer, a repair facility, a parts supplier, a logistics provider, and a rental provider. Presently, the process involves a considerable amount of communication, and coordination back and forth between potentially all of the relevant parties listed above. As such, the process may be time consuming, and there may be difficulties ensuring the correct information is received by the correct party at the correct time. By instituting the process for tracking and reporting on a blockchain significant time and resource improvements can be obtained.

One type of event related to vehicle loss history is a vehicle collision. In one embodiment, when a vehicle collision occurs, one or more of the vehicles involved may automatically generate and/or transmit a vehicle collision report and/or other indications that the one or more vehicles were involved in the collision. Additionally or alternatively, the one or more vehicles may generate and/or transmit sensor data indicative of and/or relating to the vehicle collision. In some embodiments, the report and/or sensor data may be included in and/or received via an insurance claim associated with the collision and/or an insured. Accordingly, the information relating the collision may include vehicle identifiers (such as a VIN), driver identifiers (such as a social security number), insurance claim identifiers (such as a claim number or policy number), and/or vehicle sensor data.

In some scenarios, vehicle loss history is tracked not by vehicle identifiers, but by identifiers of individuals associated with the vehicle, such as a driver or an insured. Accordingly, in some embodiments, a vehicle loss history is recorded into a blockchain such that is accessible using identifiers of individuals, as opposed to, or in conjunction with, vehicle identifiers. Accordingly, as it us used herein, the term "loss history" refers to either vehicle loss records accessed via vehicle identifiers, vehicle loss records accessed via individual and/or driver identifiers, and/or vehicle loss records accessed via some combination of vehicle identifiers and individual, insured, and/or driver identifiers.

In one exemplary embodiment, the systems and methods disclosed may be used by a participant to receive a loss history, access a block stored on a blockchain to determine if information for the vehicle is stored on the blockchain, analyze the received loss history, perform any necessary changes to information stored on the blockchain related to the vehicle and/or the loss history, and transmit the block where the vehicle information is stored, or loss history is stored, to another participant on the network. In some cases, updating and transmitting the block may include creating a new block with relevant information that will be added to the blockchain. In some embodiments, a node, such as the node 400 depicted in FIG. 4, may be the recipient of the loss history, and the node may be a part of a distributed ledger system, such as the system 112 of FIG. 1B. In some embodiments, a graphical user interface may be used to ensure that a user, or participant, may interact with the data presented and more easily track as the relevant data progresses through its process and is stored on the blockchain. Additionally, as part of the process any relevant title information, or any liens that are held against the vehicle may be part of the process.

Exemplary Computer-Implemented Method for Vehicle Loss History

Figure 7:
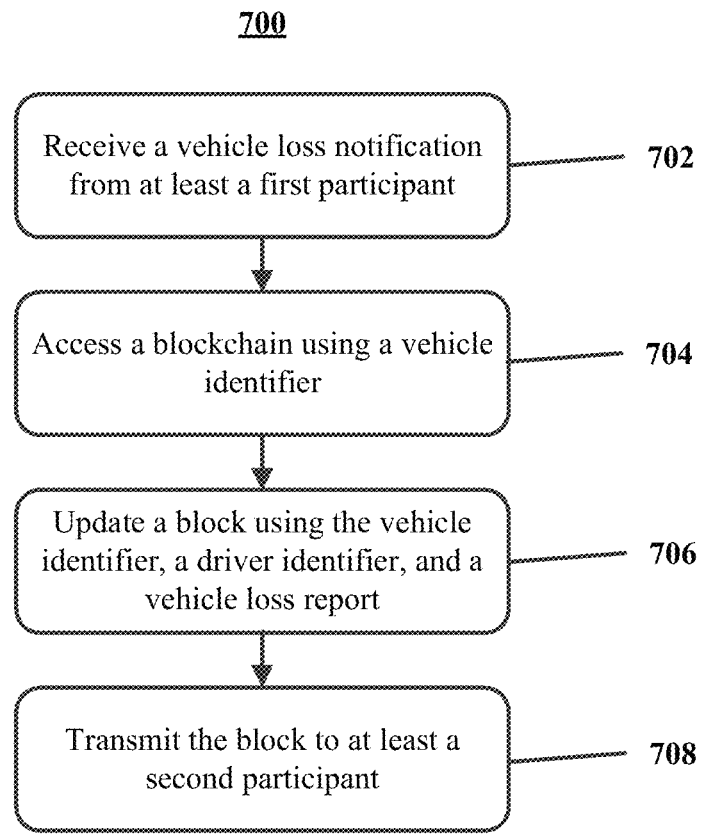
FIG. 7 depicts an exemplary flow diagram associated with one aspect of the present disclosure.

FIG. 7 depicts an exemplary flow diagram 700 associated with one aspect of the present disclosure for tracking a vehicle loss history, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 700 may be performed by the nodes in the network of participants, such as the nodes described in FIGS. 1A-4. The method 700 may include additional, fewer, or alternative actions, including those described elsewhere herein.

The exemplary flow diagram 700 may include receiving, at a processor coupled with a network interface, a vehicle loss notification from at least a first participant, wherein the vehicle loss notification may include a vehicle identifier, a driver identifier, and a vehicle loss report (block 702); accessing, at a memory coupled with a processor, the blockchain using the vehicle identifier (block 704); updating, at the memory, a block stored at the memory using the vehicle identifier, the driver identifier, and the vehicle loss report (block 706); and/or transmitting, via the processor coupled with the network interface, the block to at least a second participant (block 708).

In some embodiments, the first participant is a sensor system attached to the vehicle. In other embodiments, the first participant is a repair shop. Similarly, in some embodiments, accessing the blockchain using the vehicle identifier may further include: searching, at the processor, the blockchain using the vehicle identifier for a block which includes the vehicle identifier; and/or verifying, at the processor, the vehicle identifier stored at the block.

In other embodiments, if the vehicle identifier is not stored at a block, the method may include generating, at the processor, a vehicle record using the vehicle identifier; adding, at the processor, the vehicle identifier, the driver identifier, and the vehicle loss report to a vehicle loss transaction; linking, at the processor, the vehicle loss transaction and the vehicle record; adding, at the processor, the vehicle loss transaction to a set of vehicle loss transactions; and/or adding, at the processor, the set of vehicle loss transactions and the vehicle record to the block.

In some embodiments, updating the block may further include: adding, at the processor, the vehicle identifier, the driver identifier, and the vehicle loss report to a vehicle loss transaction; adding, at the processor, the vehicle loss transaction to a set of vehicle loss transactions; and/or adding, at the processor, the set of vehicle loss transactions to the block.

In other embodiments, the method may further include solving, at the processor, a cryptographic puzzle corresponding to the block; and/or adding, at the processor, the solution to the cryptographic puzzle to the block. Additionally, in some embodiments, the method may include updating, at the memory, the blockchain by adding the block to the blockchain.

In yet other embodiments of the method, the at least one other participant is an insurer, a vehicle owner, a repair shop, or combinations thereof. In some embodiments, the method may further include receiving, at the processor, a repair notification from at least a third participant, wherein the third participant is a repair shop.

In some embodiments, the vehicle identifier may be used to access the blockchain and identify a smart contract associated with the vehicle. The vehicle identifier, and the vehicle loss history, may be used to update the smart contract.

Exemplary Computer-Implemented Method for Updating a Loss History Blockchain

Figure 13:
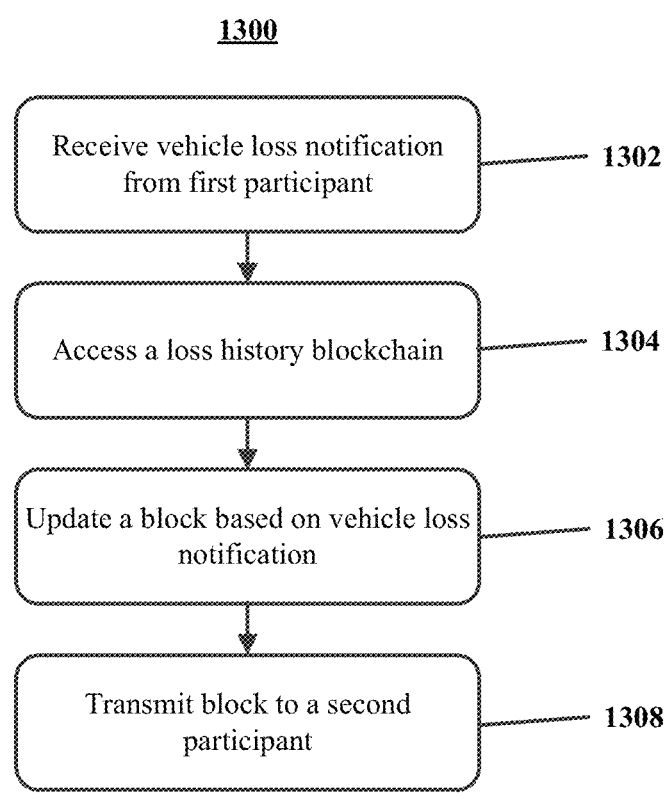
FIG. 13 depicts an exemplary flow diagram associated with one aspect of the present disclosure.

FIG. 13 depicts an exemplary flow diagram 1300 associated with one aspect of the present disclosure for tracking a loss history, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1300 may be performed by the nodes in the network of participants, such as the nodes described in FIGS. 1A-4. The method 1300 may include additional, fewer, or alternative actions, including those described elsewhere herein.

The exemplary flow diagram 1300 may include receiving, at a processor coupled with a network interface, a vehicle loss notification from at least a first participant, wherein the vehicle loss notification comprises a vehicle identifier (e.g., VIN), a driver identifier (e.g., SSN), insurance claim information, an insurance policy number, and/or a vehicle loss report (block 1302); accessing, at a memory coupled with a processor, the loss history blockchain using the vehicle identifier and/or the vehicle loss notification (block 1304); updating, at the memory, a block stored at the memory using the vehicle identifier, the driver identifier, and the insurance claim information, and/or vehicle loss report (block 1306); and/or transmitting, via the processor coupled with the network interface, the block to at least a second participant to facilitate maintaining up-to-date the loss history blockchain (block 1308).

In some embodiments, the method 1300 may include transmitting, via the processor coupled with the network interface, at least part of the vehicle loss notification to one or more nodes associated with the loss history blockchain, and/or when a consensus is formed among the one or more nodes, updating, at the memory, the loss history blockchain to include the block including the vehicle identifier, the driver identifier, and the insurance claim information, and/or the vehicle loss report.

In other embodiments, the first participant may be a sensor system attached to the vehicle. In other embodiments, the first participant may be a repair shop. Similarly, in some embodiments, accessing the blockchain using the vehicle identifier may include: searching, at the processor, the blockchain using the vehicle identifier for a block which includes the vehicle identifier; and/or verifying, at the processor, the vehicle identifier stored at the block.

In some embodiments, the method 1300 may include, if the vehicle identifier is not stored at a block, generating, at the processor, a vehicle record using the vehicle identifier; adding, at the processor, the vehicle identifier, the driver identifier, and the vehicle loss report to a vehicle loss transaction; linking, at the processor, the vehicle loss transaction and the vehicle record; adding, at the processor, the vehicle loss transaction to a set of vehicle loss transactions; and/or adding, at the processor, the set of vehicle loss transactions and the vehicle record to the block.

In other embodiments, updating the block may include: adding, at the processor, the vehicle identifier, the driver identifier, and/or the vehicle loss report to a vehicle loss transaction; adding, at the processor, the vehicle loss transaction to a set of vehicle loss transactions; and/or adding, at the processor, the set of vehicle loss transactions to the block.

In some embodiments, the method 1300 may include solving, at the processor, a cryptographic puzzle corresponding to the block; and/or adding, at the processor, the solution to the cryptographic puzzle to the block. Additionally, in some embodiments, the method 900 may include updating, at the memory, the blockchain by adding the block to the blockchain.

In yet other embodiments, the at least one other participant may be an insurer, a vehicle owner, a repair shop, and/or combinations thereof. In some embodiments, the method may include receiving, at the processor, a repair notification from at least a third participant, wherein the third participant is a repair shop.

Figure 14:
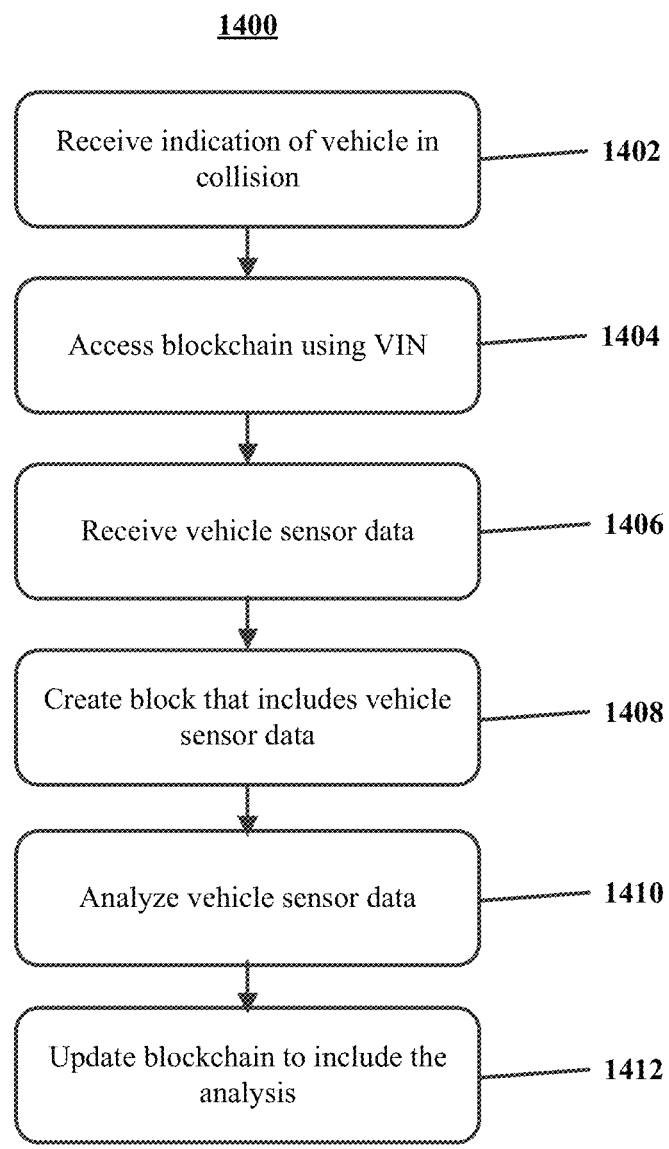
FIG. 14 depicts an exemplary flow diagram associated with one aspect of the present disclosure.

Exemplary Computer-Implemented Method for Analyzing Vehicle Sensor Data Via a Blockchain FIG. 14 depicts an exemplary flow diagram 1400 associated with one aspect of the present disclosure for tracking a loss history after vehicle collisions based upon vehicle sensor data, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1000 may be performed by the nodes in the network of participants, such as the nodes described in FIGS. 1A-4. The method 1400 may include additional, fewer, or alternative actions, including those described elsewhere herein.

The exemplary flow diagram 1400 may include receiving, via one or more processors and/or associated transceivers (such as via wireless communication or data transmission over one or more radio links), an indication of a vehicle being involved a vehicle collision and a vehicle VIN (block 1402); accessing, at a memory, a loss history blockchain associated with the vehicle using the VIN as a key (block 1404); receiving, via the one or more processors and/or associated transceivers, vehicle sensor data generated or collected prior to, during, and/or after the vehicle collision (block 1406); creating, via the one or more processors, a block to add to the loss history blockchain that includes the vehicle sensor data, or otherwise updating the loss history blockchain with the vehicle sensor data associated with the vehicle collision (block 1408); analyzing, via the one or more processors, the vehicle sensor data to reconstruct the vehicle collision (block 1410); and/or updating, via the one or more processors, the loss history blockchain to include and/or indicate the reconstructed vehicle collision (block 1412).

In some embodiments, the method 1400 may include forming a consensus among nodes of the loss history blockchain in a communication network prior to updating, at the memory, the loss history blockchain. Additionally or alternatively the method 1400 may include transmitting, via the one or more processors and/or associated transceivers, the update to the loss history blockchain to other nodes in a communication network. The one or more nodes in the communication network may be associated with a repair shop, a bank, and/or an insurance provider.

In other embodiments, receiving the vehicle sensor data may include receiving, from vehicle-mounted sensors mounted on the vehicle, the vehicle sensor data. The vehicle sensor data may include telematics data associated with the vehicle.

In some embodiments, reconstructing the vehicle collision may include determining, via the one or more processors, information relating to the vehicle collision including (i) a cause of the vehicle collision, (ii) a likely or estimated complexity of repair, (iii) one or more qualified repair shops, (iv) faulty and working vehicle-mounted sensors, and/or (v) estimate a repair cost. Determining the cause of the vehicle collision may include assigning, via the one or more processors, fault or lack thereof for the vehicle collision to one or more vehicle operators or autonomous vehicles. Additionally, updating the loss history blockchain may include updating, via the one or more processors, the loss history blockchain to include and/or indicate the determined information relating to the vehicle collision.

In yet other embodiments, updating the loss history blockchain may include creating, via the one or more processors, a new block, different than the block that indicates the vehicle sensor data, to add to the loss history blockchain. Alternatively, updating the loss history blockchain may include updating, via the one or more processors, the block that indicates the vehicle sensor data, to include and/or indicate the reconstructed vehicle collision.

Figure 15:
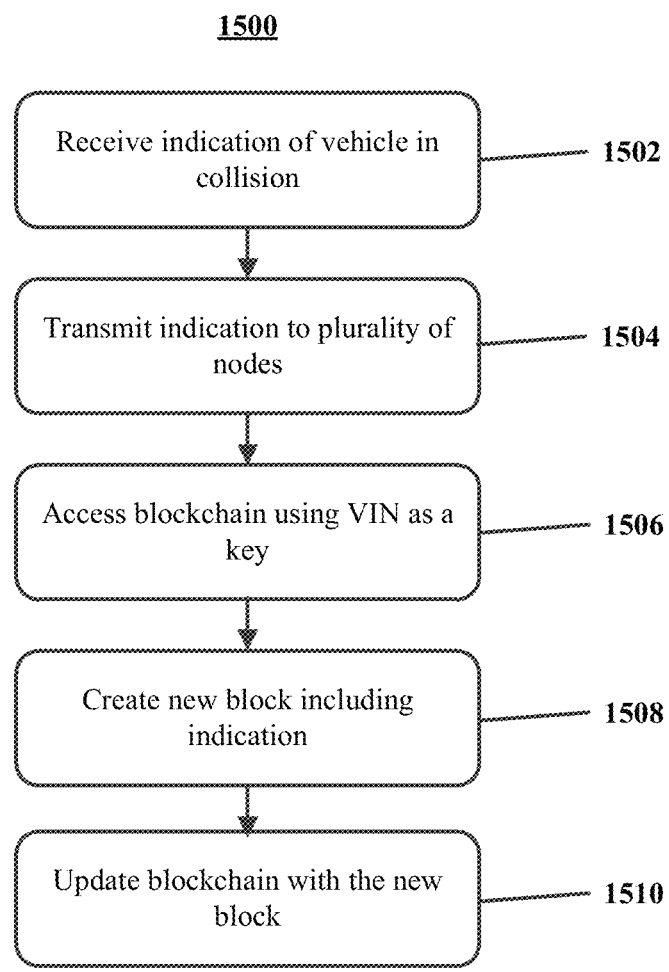
FIG. 15 depicts an exemplary flow diagram associated with one aspect of the present disclosure.

Exemplary Computer-Implemented Method for Utilizing a Block for Maintaining Vehicle Collision Loss History FIG. 15 depicts an exemplary flow diagram 1500 associated with one aspect of the present disclosure for tracking a loss history, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1500 may be performed by the nodes in the network of participants, such as the nodes described in FIGS. 1A-4. The method 1500 may include additional, fewer, or alternative actions, including those described elsewhere herein.

The exemplary flow diagram 1500 may include receiving, via one or more processors and/or associated transceivers (such as via wireless communication or data transmission over one or more radio links), an indication of a vehicle being involved a vehicle collision and a VIN of the vehicle (block 1502); transmitting, via the one or more processors and/or associated transceivers, the indication of the vehicle being involved in a vehicle collision and the VIN to a plurality of nodes of a loss history blockchain (block 1504); accessing, via the one or more processors, the loss history blockchain associated with the vehicle using the VIN as a key (block 1506); creating, via the one or more processors, a new block including the indication of a vehicle being involved in a vehicle collision and/or insurance claim information (block 1508); and/or updating, via the one or more processors, the loss history blockchain with the new block by forming a consensus on the new block with the plurality of nodes of the loss history blockchain to facilitate maintaining the loss history blockchain up-to-date (block 1510).

In some embodiments, a node of the plurality of nodes may be a sensor system attached to the vehicle. In other embodiments, a node of the plurality of nodes may be a repair shop. Similarly, in some embodiments, accessing the blockchain using the VIN may further include: searching, via the one or more processors, the loss history blockchain using the VIN for a block which includes the VIN; and/or verifying, via the one or more processors, the VIN stored at the block.

In some embodiments, if the VIN is not stored at a block, the method 1500 may include generating, via the one or more processors, a vehicle record using the VIN; adding, via the one or more processors, the VIN and the indication of a vehicle being involved the vehicle collision to a vehicle loss transaction; linking, via the one or more processors, the vehicle loss transaction and the vehicle record; adding, via the one or more processors, the vehicle loss transaction to a set of vehicle loss transactions; and/or adding, via the one or more processors, the set of vehicle loss transactions and the vehicle record to the created block.

In other embodiments, updating the loss history blockchain further includes: adding, via the one or more processors, the VIN and the indication of a vehicle being involved the vehicle collision to a vehicle loss transaction; adding, via the one or more processors, the vehicle loss transaction to a set of vehicle loss transactions; and/or adding, via the one or more processors, the set of vehicle loss transactions to the created block.

In some embodiments, the method 1500 may include solving, via the one or more processors, a cryptographic puzzle corresponding to the created block; and/or adding, via the one or more processors, the solution to the cryptographic puzzle to the created block. Additionally or alternatively, the method 1500 may include updating, at the memory, the blockchain by adding the created block to the loss history blockchain.

In yet other embodiments of the method 1500, the plurality of nodes includes at least one node associated with an insurer, a vehicle owner, a repair shop, or combinations thereof. In some embodiments, the method 1500 may include receiving, via the one or more processors, a repair notification from a node associated with a repair shop.

Figure 16:
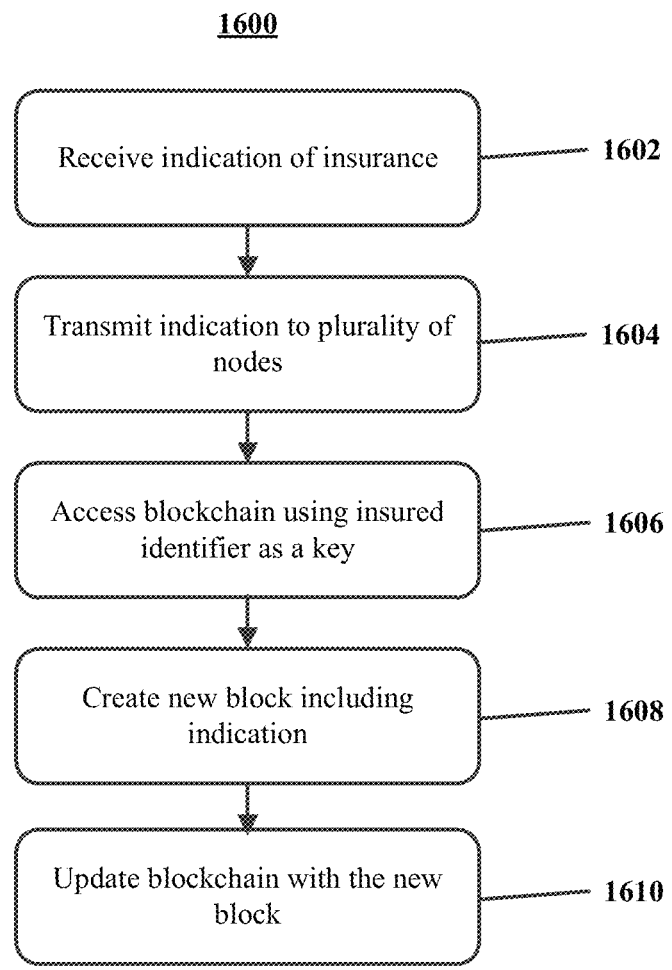
FIG. 16 depicts an exemplary flow diagram associated with one aspect of the present disclosure.

Exemplary Computer-Implemented Method for Utilizing a Blockchain for Maintaining Insured Loss History FIG. 16 depicts an exemplary flow diagram 1600 associated with one aspect of the present disclosure for tracking a loss history, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1600 may be performed by the nodes in the network of participants, such as the nodes described in FIGS. 1A-4. The method 1600 may include additional, fewer, or alternative actions, including those described elsewhere herein.

The exemplary flow diagram 1600 may include receiving, via one or more processors and/or associated transceivers (such as via wireless communication or data transmission over one or more radio links), an indication that the insured has filed an insurance claim associated with an insurance policy covering an insured asset and an identifier associated with the insured (block 1602); transmitting, via the one or more processors and/or associated transceivers, the indication and the insured identifier to a plurality of nodes of a blockchain network (block 1604); accessing, via the one or more processors, the loss history blockchain associated with the insured using the insured identifier as a key (block 1606); creating, via the one or more processors, a new block including the indication of the insurance claim and/or the insured identifier (block 1608); and/or updating, via the one or more processors, the loss history blockchain with the new block by forming a consensus on the new block with the plurality of nodes of the loss history blockchain to facilitate maintaining the loss history blockchain up-to-date (block 1610).

In some embodiments, the insured identifier may be a social security number or a policy number. In other embodiments, a node of the plurality of nodes may be associated with the insured. Similarly, in some embodiments, accessing the loss history blockchain using the insured identifier may include searching, via the one or more processors, the loss history blockchain using the insured identifier for a block which includes the insured identifier; and/or verifying, via the one or more processors, the insured identifier stored at the block.

In some embodiments, if the insured identifier is not stored at a block, the method 1600 may include generating, via the one or more processors, an insured record using the insured identifier; adding, via the one or more processors, the insured identifier and the indication of the insurance claim to an insured loss transaction; linking, via the one or more processors, the insured loss transaction and the insured record; adding, via the one or more processors, the insured loss transaction to a set of insured loss transactions; and/or adding, via the one or more processors, the set of insured loss transactions and the insure record to the created block.

In other embodiments, updating the loss history blockchain may include adding, via the one or more processors, the insured identifier and the indication of the insurance claim to an insured loss transaction; adding, via the one or more processors, the insured loss transaction to a set of insured loss transactions; and/or adding, via the one or more processors, the set of insured loss transactions to the created block.

In some embodiments, the method 1600 may include solving, via the one or more processors, a cryptographic puzzle corresponding to the created block; and/or adding, via the one or more processors, the solution to the cryptographic puzzle to the created block. Additionally or alternatively, the method 1600 may include updating, at the memory, the loss history blockchain by adding the created block to the loss history blockchain.

In yet other embodiments, the plurality of nodes includes at least one node associated with an insurer, a vehicle, a repair shop, or combinations thereof. In some embodiments, the method 1600 may include receiving, via the one or more processors, a repair notification from a node associated with a repair shop.

Exemplary Computer-Implemented Method for Claim Processing Via Blockchain

Figure 17:
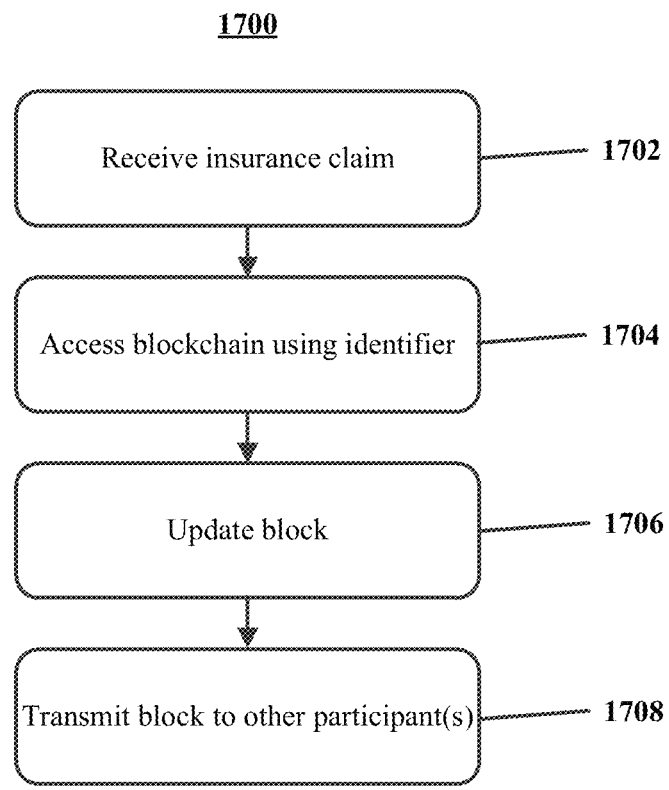
FIG. 17 depicts an exemplary flow diagram associated with one aspect of the present disclosure.

FIG. 17 depicts an exemplary flow diagram 1700 associated with one aspect of the present disclosure for tracking a loss history, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1700 may be performed by the nodes in the network of participants, such as the nodes described in FIGS. 1A-4. The method 1700 may include additional, fewer, or alternative actions, including those described elsewhere herein.

The exemplary flow diagram 1700 may include receiving, at one or more processors coupled with a network interface, an insurance claim from a first participant, the insurance claim indicating that an insured asset has suffered a loss or been involved with an insurance-related event causing damage to the insured asset (block 1702); accessing, at a memory coupled with the one or more processors, the loss history blockchain using the identifier (block 1704); updating, at the memory, a block stored at the memory to associate the insurance claim with the individual or insured asset (block 1706); and/or transmitting, via the one or more processors coupled with the network interface, the block to at least one other participant to facilitate maintaining the loss history blockchain related to the individual or the insured asset up-to-date (block 1708).

In some embodiments, the insurance claim may be verified by a network of nodes forming a consensus to update the loss history blockchain prior to the block being added to the loss history blockchain. Additionally or alternatively, updating the block may include creating, via the one or more processors, the block.

In some embodiments, the identifier may be an individual identifier such as a social security number and/or an insurance policy number. In other embodiments, the identifier is an asset identifier, such as a vehicle identification number and/or a home tax parcel number.

Additionally or alternatively, accessing the loss history blockchain using the identifier may include searching, via the one or more processors, the loss history blockchain using the identifier for a block which includes the identifier; and/or verifying, via the one or more processors, the identifier stored at the block. In some embodiments, if the identifier is not stored at a block, the method 1700 may include generating, via the one or more processors, a claim record using the identifier; adding, via the one or more processors, the identifier and the indication of the insurance claim to a transaction; linking, via the one or more processors, the transaction and the claim record; adding, via the one or more processors, the transaction to a set of transactions; and/or adding, via the one or more processors, the set of transactions and the claim record to the block.

In other embodiments, updating the loss history blockchain may include adding, via the one or more processors, the identifier and the indication of the insurance claim to a transaction; adding, via the one or more processors, the transaction to a set of transactions; and/or adding, via the one or more processors, the set of transactions to the block.

Figure 18:
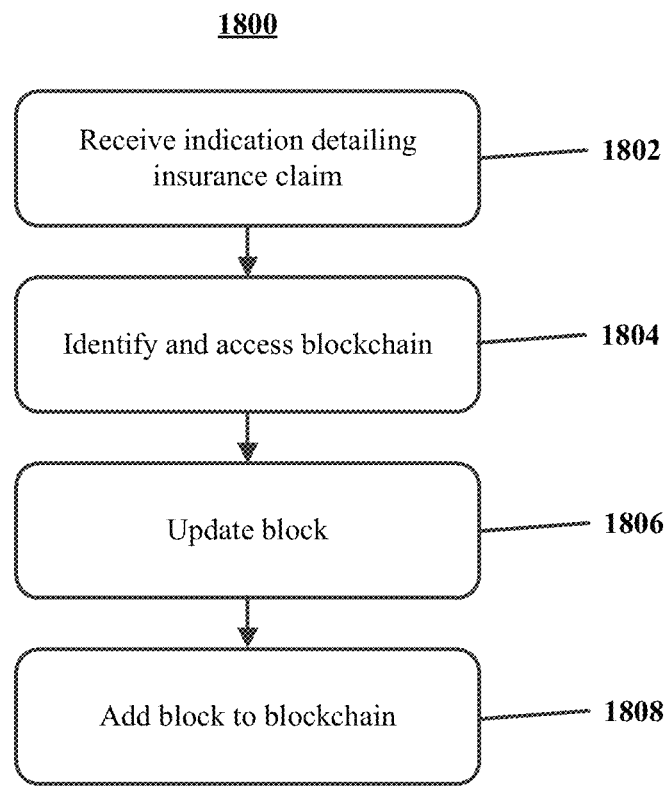
FIG. 18 depicts an exemplary flow diagram associated with one aspect of the present disclosure.

Exemplary Computer-Implemented Method for Updating an Insured Loss History Blockchain FIG. 18 depicts an exemplary flow diagram 1800 associated with one aspect of the present disclosure for tracking a loss history, stored on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1800 may be performed by the nodes in the network of participants, such as the nodes described in FIGS. 1A-4. The method 1800 may include additional, fewer, or alternative actions, including those described elsewhere herein.

The exemplary flow diagram 1800 may include receiving, via one or more processors and/or associated transceivers (such as via wireless communication or data transmission over one or more radio frequency links or digital communication channels), an indication that an insurance claim has been filed and/or information detailing the insurance claim (block 1802); identifying and accessing, via the one or more processors, a loss history blockchain associated with the individual or the insured asset (block 1804); updating, via the one or more processors, a block to reflect or indicate the insurance claim and/or information detailing the insurance claim (block 1806); and/or adding, via the one or more processors, the block to the loss history blockchain to facilitate maintaining up-to-date the loss history blockchain detailing the loss history associated with the individual or the insured asset (block 1808).

In some embodiments, adding the block to the loss history blockchain may include forming, via the one or more processors, a consensus on the block with the plurality of nodes of the blockchain. In other embodiments, the method 1800 may include solving, via the one or more processors, a cryptographic puzzle corresponding to the block; and/or adding, via the one or more processors, the solution to the cryptographic puzzle to the block.

Additionally or alternatively, updating the block may include creating, via the one or more processors, the block to be added to the loss history blockchain, and/or adding, at a memory, a transaction using or including the information detailing the insurance claim to the block.

In some embodiments, the loss history blockchain may be identified and accessed using an individual identifier such as a social security number, a name, or an insurance policy number. In other embodiments, the loss history blockchain is identified and accessed using an asset identifier, such as a vehicle identification number or a home tax parcel number.

Additionally or alternatively, the information detailing the insurance claim may include information identifying the insured, the insured asset, a policy number, an insurance provider, or an amount of damage.

Vin Lifecycle

In one embodiment, the systems and methods may be directed to tracking a vehicle identifier on a blockchain maintained by a plurality of participants. The vehicle identifier may be a vehicle identification number, more commonly referred to as a VIN. The VIN may conform to a particular standard for vehicle identification numbers such as standards formulated and promulgated by, for example, the Federal Motor Vehicle Safety Standards, the International Standards Organization Standards, the Society of Automotive Engineers Standards, and/or the Australian Design Rules standards. These, and other, standards have particular information requirements that must be met for vehicles that are manufactured, imported/exported, or sold within particular jurisdictions.

Some of the information that these standards require for disclosure in the VIN are: a world manufacturer identifier, attributes of the vehicle (e.g., automotive platform used, the model for the vehicle, the body style of the vehicle, any safety features of the vehicle, self-driving features for the vehicle, autonomous vehicle characteristics for the vehicle), a vehicle model year, vehicle identifier information to identify that particular vehicle, any software or software versions for systems used by the vehicle or its components, and more particular information about the vehicle manufacturer. VINs are used for many types of vehicles, such as, for example, individual motor vehicles, towed vehicles, motorcycles, scooters and mopeds. The VIN must be reported to several agencies after the vehicle is manufactured, and throughout the lifecycle of the vehicle. For example, the VIN must be checked when a vehicle is sold, or when the vehicle is destroyed. Any updates to the vehicle may impact the VIN, and accordingly new information may need to be added to the blockchain, such as an odometer reading. By instituting the process for tracking the VIN from manufacture to salvage, aka "cradle to the grave," on a blockchain significant time and resource improvements can be obtained.

In one exemplary embodiment, the systems and methods disclosed may be used by a participant to receive a vehicle identifier notification, access a block stored on a blockchain to determine if information for the vehicle corresponding to the vehicle identifier notification is stored on the blockchain, analyze the received vehicle identifier notification, perform any necessary changes to information stored on the blockchain related to the vehicle and/or the vehicle identifier notification, and transmit the block where the vehicle information is stored, or a vehicle identifier notification is stored, to another participant on the network. In some cases, updating and transmitting the block includes creating a new block with relevant information that will be added to the blockchain.

In some embodiments, a node, such as the node 400 depicted in FIG. 4, may be the recipient of the vehicle loss history, and the node may be a part of a distributed ledger system, such as the system 112 of FIG. 1B. In some embodiments, a graphical user interface may be used to ensure that a user, or participant, may interact with the data presented and more easily track as the relevant data progresses through its process and is stored on the blockchain. Additionally, as part of the process any relevant title information, or any liens that are held against the vehicle may be part of the process.

Exemplary Computer-Implemented Method for Vin Lifecycle

Figure 8:
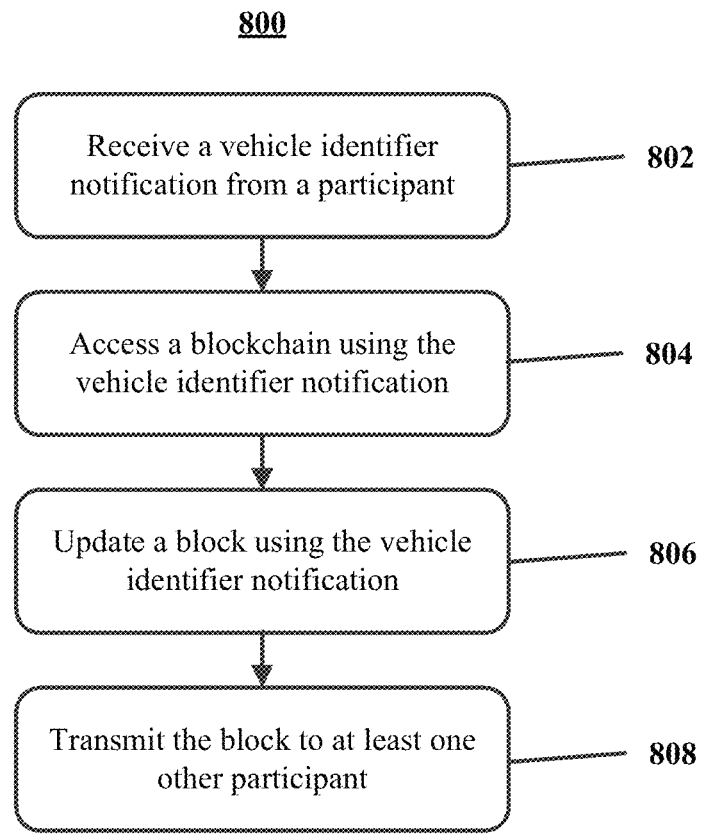
FIG. 8 depicts an exemplary flow diagram associated with one aspect of the present disclosure.

FIG. 8 depicts an exemplary flow diagram 800 associated with one aspect of the present disclosure for tracking a vehicle identifier on a blockchain maintained by a plurality of participants. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 800 may be performed by the nodes in the network of participants, such as the nodes described in FIGS. 1A-4. The method 800 may include additional, fewer, or alternative actions, including those described elsewhere herein.

The exemplary flow diagram 800 may include receiving, at a processor coupled with a network interface, a vehicle identifier notification from a participant (block 802); accessing, at a memory coupled with a processor, the blockchain using the vehicle identifier notification (block 804); updating, at the memory, a block stored at the memory using the vehicle identifier notification (block 806); and/or transmitting, via the processor coupled with the network interface, the block to at least one other participant (block 808).

In some embodiments, the vehicle identifier notification includes a notification source, a vehicle identifier set, and a notification event. Further, in some embodiments of the method, the vehicle identifier set includes a manufacturer, a descriptor section, and an identifier section. Alternatively, the notification event is a vehicle transfer, a vehicle accident, a vehicle repair incident, a vehicle modification, or combinations thereof.

In some embodiments, accessing the blockchain using the vehicle identifier notification may also include: verifying, at the processor, a notification source for the vehicle identifier notification; identifying, at the processor, an entry in the blockchain corresponding to the vehicle identifier notification; and/or accessing, at the memory, the entry in the blockchain corresponding to the vehicle identifier notification.

In other embodiments, updating the blockchain using the vehicle identifier notification may also include: verifying, at the processor, that an entry in the blockchain corresponding to the vehicle identifier notification exists; and wherein if the entry does not exist, adding, at the memory, an entry in the blockchain corresponding to the vehicle identifier notification.

An alternative embodiment of the method may include tracking a vehicle identifier on a blockchain maintained by a plurality of participants, the method may include: receiving, at a processor coupled with a network interface, a vehicle identifier notification from a participant; accessing, at a memory coupled with a processor, the blockchain using the vehicle identifier notification; updating, at the memory, a block stored at the memory using the vehicle identifier notification; generating, at the processor, a solution to a cryptographic puzzle involving the block; and/or transmitting, via the processor coupled with the network interface, the block and the solution to the cryptographic puzzle to at least one other participant.

In some embodiments, accessing the blockchain using the vehicle identifier notification may also include: verifying, at the processor, a notification source for the vehicle identifier notification; identifying, at the processor, an entry in the blockchain corresponding to the vehicle identifier notification; and/or accessing, at the memory, the entry in the blockchain corresponding to the vehicle identifier notification. Furthermore, in some embodiments updating the blockchain using the vehicle identifier notification may also include: verifying, at the processor, that an entry in the blockchain corresponding to the vehicle identifier notification exists; and wherein if the entry does not exist, adding, at the memory, an entry in the blockchain corresponding to the vehicle identifier notification.

In some embodiments, the vehicle identifier may be used to access the blockchain and identify a smart contract associated with the vehicle. The vehicle identifier, and the complimentary notification, may be used to update the smart contract.

Exemplary Vin Chain or Blockchain Vin Registry

FIG. 9 depicts an exemplary VIN Chain 900. The VIN Chain may be a Blockchain VIN Registry as discussed herein. The VIN for a vehicle may act a key, or other provides access, to the Vin Chain 900, and in some embodiments may be hashed or encrypted.

In some embodiments, each VIN Chain 900 may be a blockchain dedicated to an individual autonomous, smart, or other (conventional) vehicle. The VIN Chain 900 may be required to include the VIN for the vehicle. The VIN may be used to access, identify, or verify the VIN Chain 900 or distributed ledger is associated with the vehicle. The VIN Chain 900 may include one or more additional data elements associated with the vehicle, including those depicted in FIG. 9.

As shown in FIG. 9, the VIN Chain 900 or Blockchain VIN Registry may have a VIN number associated with a particular vehicle that acts as a key to accessing or updating the VIN Chain 900. The VIN Chain 900 may have several data elements, including (1) owner information, (2) title status (clean, salvaged, etc.), (3) lienholder information, (4) lien payoff amount, (5) insurance policy start and stop date, (6) insurance claim open and close date, (7) build data (vehicle features), (8) maintenance and repair dates and types, (9) telematics and odometer data, and/or other data elements, including those discussed elsewhere herein.

For instance, the additional data elements may include telematics data (such as driving, braking, speed, cornering, stop/start, acceleration, etc.) associated with a particular driver or vehicle. The insurance policy information may include UBI or trip-based insurance details, such as location and mileage information. The insurance policy information may also include premiums, discounts, coverages, deductibles, limits, and/or conditions.

As shown in FIG. 9, the owner information and title status blocks in the VIN Chain 900 may be created or updated, and subsequently accessed or read by manufacturers, dealerships, body shops, DMVs, insurers, salvage vendors, individual smart vehicles, vehicle owners, authorized 3rd parties, and/or other entities. One use case for this type of information in a blockchain is title tracking from "cradle to grave."

The lienholder and lien amount information blocks in the VIN Chain 900 may by created or updated by lienholders or vehicle owners, and subsequently accessed by insurers, lienholders, and/or consumers. Use cases for this type of information in a blockchain may be the claim payment for a total loss situation, and/or automobile refinancing.

The insurance policy start and end data, and claim open and close date information blocks in the VIN Chain 900 may be created or updated by insurers, smart vehicles, or consumers, and subsequently accessed or read by insurers, lienholders, other vehicles, and consumers. The use cases for this type of information in a blockchain may be providing evidence of insurance, detecting buildup or fraud, and/or alternatively verifying the veracity of insurance claims.

The build data (such as vehicle features or technology) blocks in the VIN claim 900 may be created or updated by manufactures or individual smart vehicles, and subsequently read by other vehicles, insurers, consumers, other manufacturers, repair shops, etc. Use cases for this type of information in a blockchain may include insurance rating (e.g., vehicles having different safety or technological systems that lower or otherwise impact risk may be rated different), and improved repair cost estimates.

The maintenance and repair data blocks in the VIN claim 900 may be created or updated, and subsequently read or accessed by body shops, repair facilities, insurers, individual smart or connected vehicles, etc. A use case for this type of information in a blockchain may include maintaining the vehicle history.

The telematics and/or odometer data blocks in the VIN Chain 900 may be created or updated by individual smart or connected vehicles, and subsequently read by the vehicles, consumers, insurers, or other 3rd parties. The telematics and/or odometer data may be used to update smart contracts associated with UBI (Usage-Based Insurance), which may provide insurance for a limited amount of miles or time. Use cases for this type of information in a blockchain may include claim processing, updating insurance discounts, and/or issuing new or additional UBI smart contracts.

Exemplary Vin-Based Vehicle Services

Figure 10:
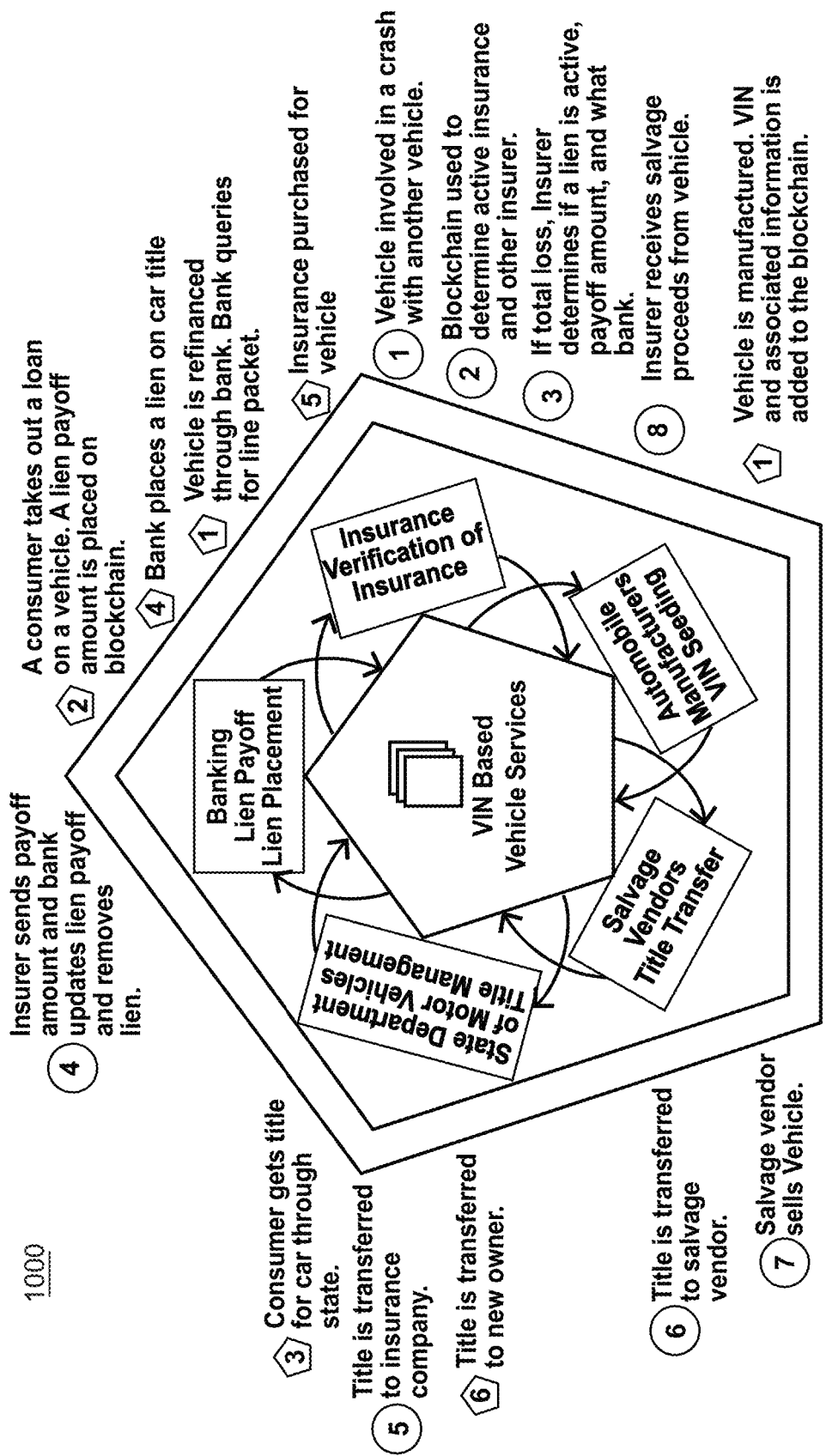
FIG. 10 depicts exemplary VIN-based vehicle services that may be facilitated via a Blockchain VIN Registry.

FIG. 10 depicts exemplary VIN-based vehicle services 1000 that may be facilitated via the Blockchain VIN Registry. The VIN-based vehicle services may relate to (1) State Department of Motor Vehicles (e.g., vehicle registration, title management, title transfer, license plates, etc.); (2) Banking (e.g., lien payoff, lien placement or transfer, etc.); (3) Insurance (e.g., verification of insurance, insurance quoting, claim handling, total loss, etc.); (4) Automobile Manufacturers (e.g., VIN seeding, recall notices, technology upgrades, updated software versions, etc.); and/or (5) Salvage Vendors (e.g., title transfer, exchange of monies, sensor or part valuation, vehicle or sensor auction, total loss, etc.).

In one embodiment, transactions associated with a total loss determination may be recorded on the Blockchain VIN Registry. The transactions may include the VIN, and data related to the following events or conditions: (1) a vehicle is involved in a crash with another vehicle; (2) a blockchain may be used to determine active insurance and another insurer; (3) determine if a lien is active, and if so, the present payoff amount, and identify the bank or other lender; (4) the insurer may send the payoff amount and the bank may update the lien payoff and remove the lien on vehicle; (5) title or e-title is transferred to an insurance company; (6) title or e-title is later transferred to a salvage vendor; (7) the salvage vendor may sell the vehicle; and/or (8) after which, title or e-title is subsequently transferred to new owner, and/or the insurer receives salvage proceeds from vehicle being sold.

In another embodiment, transactions associated with vehicle manufacture and initial vehicle purchase/loan may be recorded on the Blockchain VIN Registry. The transactions may include the VIN, and vehicle or other data related to the following events or conditions: (1) a new vehicle is manufactured, and VIN and associated information is added to the blockchain; (2) a consumer takes out a loan on the new (or another) vehicle, and a lien payoff amount is placed on the blockchain; (3) the consumer receives title or e-title to the vehicle through the State DMV; (4) the bank places a lien on the vehicle title or e-title; and/or (5) auto insurance is purchased for the driver, vehicle, and/or autonomous vehicle.

In another embodiment, transactions associated with vehicle refinancing may be recorded on the Blockchain VIN Registry. The transactions may include the VIN, and vehicle or other data related to the following events or conditions: (1) a vehicle may be refinanced through an original or subsequent bank, (2) the bank may query for a lien packet, (3) loan terms may be determined and updated, (4) payoff amounts may be updated, etc.

Exemplary Virtual Claim Experience Using Blockchain

Figure 11:
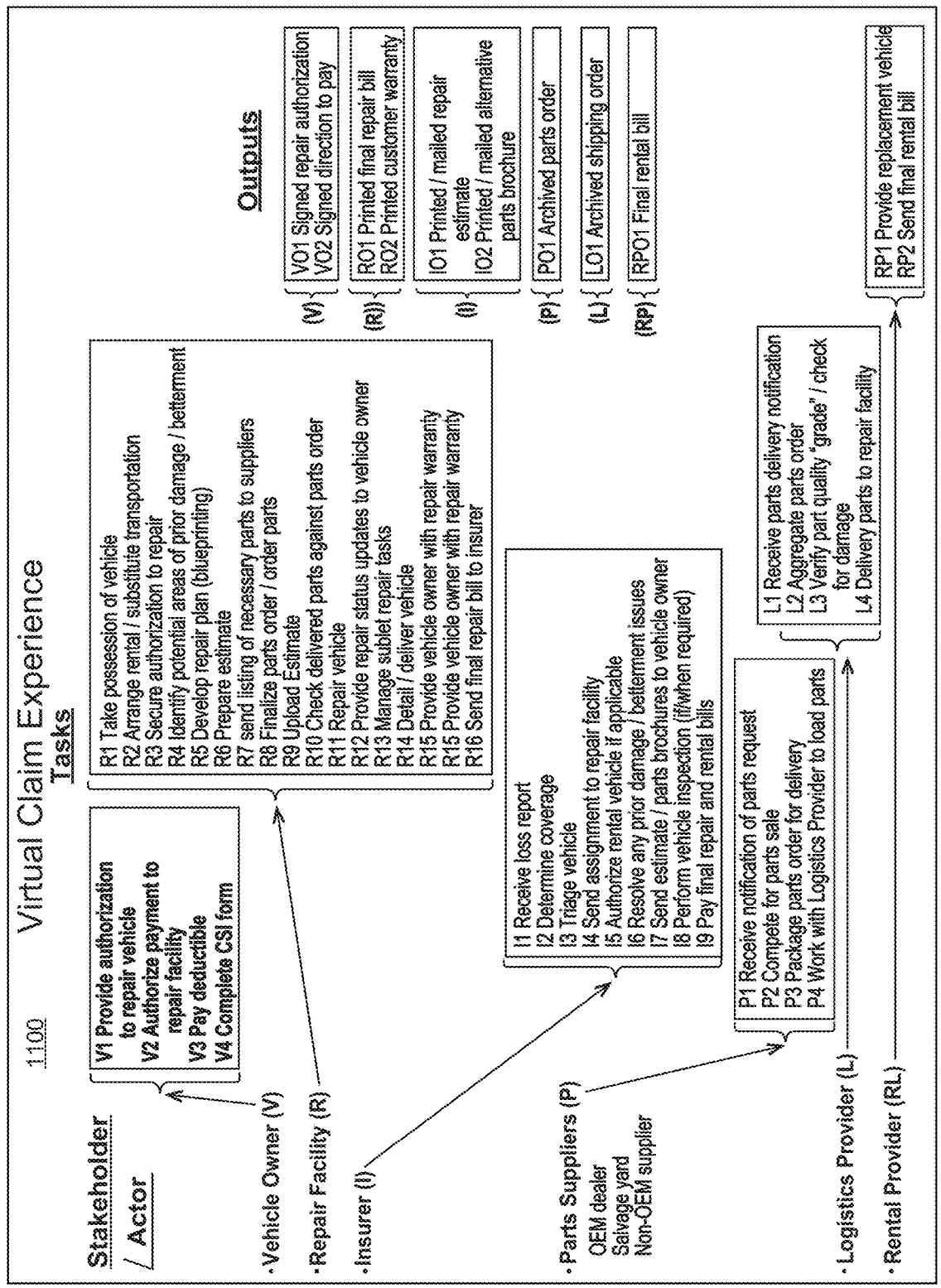
FIG. 11 depicts exemplary transactions that may be recorded, logged, or updated in each block of a distributed ledger or a Blockchain VIN Registry.

FIG. 11 depicts exemplary transactions that may be recorded, logged, or updated in each block of a distributed ledger or Blockchain VIN Registry 1100. The transactions may each include a VIN for a particular vehicle, and one or more additional data elements. The additional data elements may include (i) identification a stakeholder or actor; (ii) tasks to be performed or that have been completed; (iii) an output; and/or (iv) other data, including that discussed elsewhere herein.

The stakeholder or actor data elements may indicate or identify (1) vehicle owners, (2) repair facilities, (3) insurer, (4) part suppliers, (5) logistics providers, and/or (6) rental providers. Each stakeholder or actor data element may have a corresponding task assigned, or a task be, or has been, completed.

The task data elements for, and/or associated with, vehicle owners may include (1) providing authorization to repair vehicle; (2) authorizing payment to a repair facility; (3) paying a deductible; and/or (4) completing any necessary forms.

The task data elements for, and/or associated with, repair facilities may include (1) taking possession of vehicle; (2) arranging for rental/substitute transportation; (3) securing authorization to repair; (4) identifying potential areas of prior damage/betterment; (5) developing a repair plan; (6) preparing an estimate; (7) sending a listing of necessary parts to suppliers; (8) finalizing parts order and ordering parts; (9) uploading an estimate; (10) checking delivered parts versus parts ordered; (11) repairing the vehicle; (12) providing a repair status updates to the vehicle owner; (13) managing sublet repair tasks; (14) detailing and delivering the vehicle; (15) providing the vehicle owner with a repair warranty; and/or (16) sending a final repair bill to the insurer.

The task data elements for, and/or associated with, insurers may include (1) receiving a loss report; (2) determining coverage and policy conditions; (3) vehicle triage; (4) sending an assignment to the repair facility; (5) authorizing a rental vehicle if applicable; (6) resolving any prior damage/betterment issues; (7) sending an estimate and parts brochures to the vehicle owner; (8) performing a vehicle inspection if and when required; and/or (9) paying the final repair and any rental bills.

The task data elements for, and/or associated with, parts suppliers may include (1) receiving notification of a parts request; (2) competing for a parts sale; (3) packaging parts order for delivery; and/or (4) working with logistics provider to load parts.

The task data elements for, and/or associated with, logistics providers may include (1) receiving parts delivery notification; (2) aggregating a parts order; (3) verifying part quality "grade" and/or checking for part damage; and/or (4) delivering parts to repair facility.

The task data elements for, and/or associated with, rental providers may include (1) providing replacement or rental vehicles; and/or (2) sending a final rental bill.

The output data elements that may be associated with transactions, and identified by VIN, and added to the Blockchain VIN Registry may further include signed repair authorizations and signed directions to pay (associated with the vehicle owner); printed final repair bills and printed customer warranties (associated with the repair facility); printed or mailed repair estimates and printed or mailed alternative parts brochures (associated with the insurer); archived parts orders (associated with the parts supplier); archived shipping orders (associated with the logistics provider); and final rental bills (associated with the rental provider).

Proof of Insurance

Figure 12:
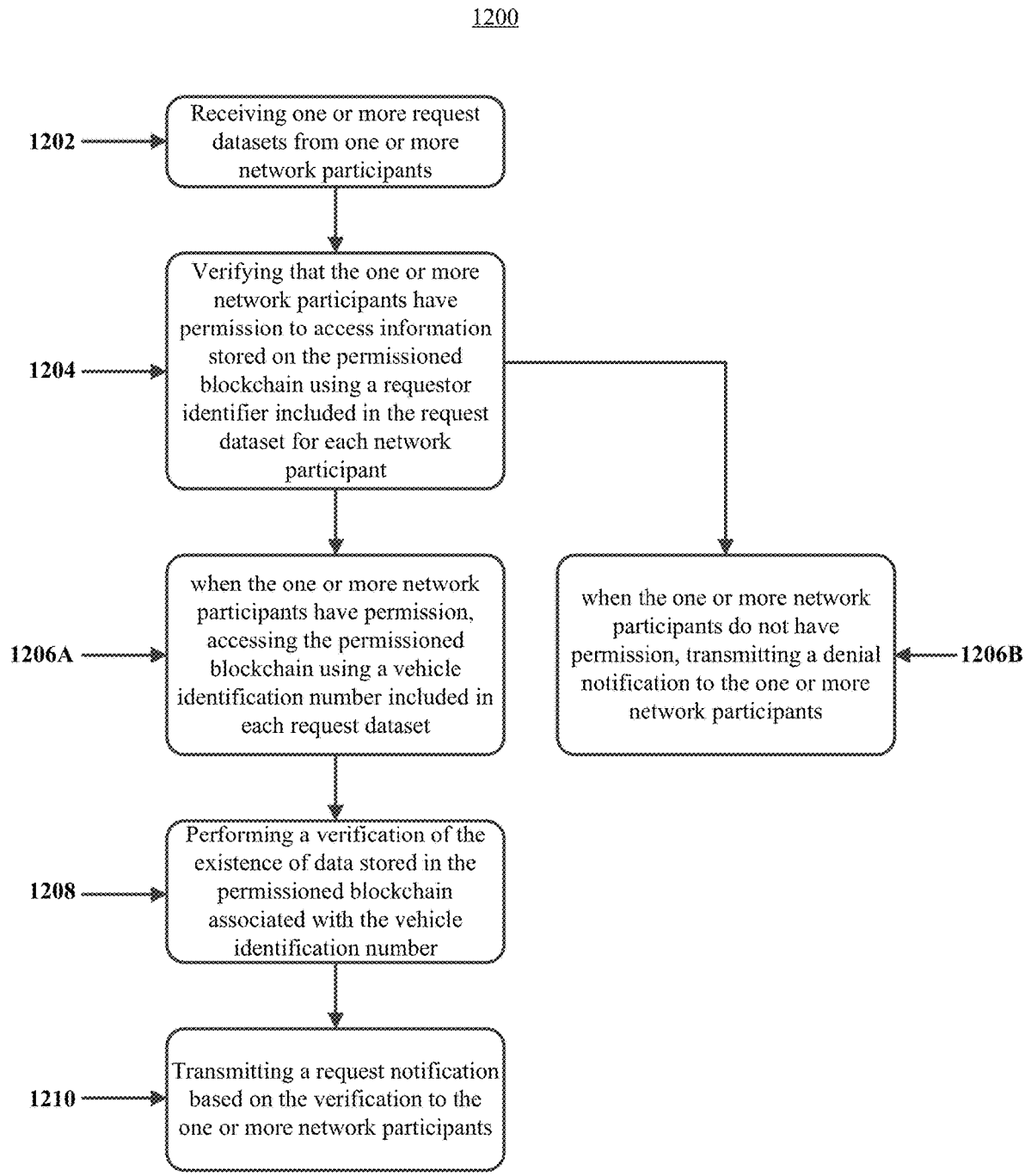
FIG. 12 depicts an exemplary flow diagram associated with one aspect of the present disclosure.

FIG. 12 depicts an exemplary flow diagram 1200 associated with one aspect of the present disclosure. In some embodiments, the network of participants may be the nodes described above, for example node 400 depicted in FIG. 4. The blockchain used by the participants may be the blockchain 500 depicted in FIG. 5, whose operation is described in FIGS. 2A, 2B, and 5. The steps of the computer-implemented method 1200 may be performed by the nodes in the network of participants, such as the nodes described in FIGS. 1A-4. The method 1200 may include additional, fewer, or alternative actions, including those described elsewhere herein.

The exemplary flow diagram 1200 may include receiving, at a processor coupled with a network interface, one or more request datasets from one or more network participants (block 1202); verifying, at the processor, that the one or more network participants have permission to access information stored on the permissioned blockchain using a requestor identifier included in the request dataset for each network participant (block 1204); when the one or more network participants have permission, accessing, at a memory coupled with the processor, the permissioned blockchain using a vehicle identification number included in each request dataset (block 1206A); performing, at the processor coupled with the memory, a verification of the existence of data stored in the permissioned blockchain associated with the vehicle identification number (block 1208); transmitting, via the processor coupled with the network interface, a request notification based upon the verification to the one or more network participants (block 1210); and/or when the one or more network participants do not have permission, transmitting, via the processor coupled with the network interface, a denial notification to the one or more network participants (block 1206B).

In some embodiments, the plurality of network participants comprises a law enforcement agency, a state regulatory agency, an insurance agency, or combinations thereof. Similarly, in some embodiments each request dataset further comprises a request id, a request type, and a requestor type. In alternative embodiments, the requestor identifier comprises a hash value associated with a cryptographic key controlled by the corresponding network participant.

In some embodiments, performing a verification of the existence of data stored in the permissioned blockchain associated with the vehicle identification number, may further include: identifying, at the processor, a request type included in the request dataset, wherein the request type includes a verification request, a modification request, or a new transaction request; when the request type is a verification request, verifying, at the processor, the existence of data associated with the vehicle identification number, when the data associated with the vehicle identification number does not exist, transmit a nonexistence notification associated with the vehicle identifier to at least one other network participant; when the request type is a modification request, transmitting, at the processor coupled with the network interface, a coverage dataset based upon the request dataset and the modification request to at least one of network participant; and when the request type is a new transaction request, generating and transmitting, at the processor coupled with the network interface, a coverage dataset based upon the request dataset and the new transaction request to at least one of network participant.

In other embodiments, the modification request may include a policy renewal, a policy change, or a policy transfer associated with the vehicle identification number. In yet other embodiments, transmitting a request notification based upon the verification to the one or more network participants, may further include: generating, at the processor, the request notification using the request type and a success indicator indicating whether a coverage dataset was sent to at one other network participant.

Additional Considerations

This detailed description is to be construed as exemplary only and does not describe every possible embodiment, as describing every possible embodiment would be impractical, if not impossible. One may be implement numerous alternate embodiments, using either current technology or technology developed after the filing date of this application.

An authoritative, trusted, immutable, distributed, shareable, secure system may be needed to record if a human driver is controlling a vehicle, and/or if the vehicle is acting autonomously. The record may include crash sensor data to record crash information correlating to driver control information.

Blockchain technology may be used to store the transactions of control instances (from autonomous to human control to autonomous, for example). These control instances may be stored as they occur into blocks. Accordingly, this data may be included into the distributed ledger environment of the blockchain. In this environment, a consensus system may fix the events/blocks immutably and securely.

In some scenarios, the blockchain may have public interfaces that allow visibility into the data. In one embodiment, a private blockchain interface may also be used by auto manufacturers, law enforcement, insurers, and regulatory agencies.

An element of smart contracts may also be enabled in the system. Depending on the sequence of events in the blockchain, terms of the smart contract may be executed immediately, such as sending a tow truck to the geolocation if tow assistance is a part of the policy, filing a legal action by a subrogation team of an insurer is brought against an auto manufacturer (for example, if an accident occurs when the autonomous vehicle was in autonomous control), conducting a policy review, filing a police report request with the jurisdiction of the roadway, processing claims awards made (for example, a partial payment if deductible is met, to handle car rental or minor medical expense), sending a renewal notice for the policy, and so on.

In some aspects, customers may opt-in to a rewards, loyalty, or other program. The customer may allow a remote server, such as an enforcement server, to collect sensor, telematics, vehicle, smart or autonomous vehicle, mobile device, smart home, and other types of data discussed herein. With customer permission or affirmative consent, the data collected may be analyzed to provide certain benefits to customers. For instance, insurance cost savings may be provided to lower risk or risk averse customers. Discounts, including cryptocurrency or digital or electronic currency, may be awarded to accounts associated with the customer. The other functionality discussed herein may also be provided to customers in return for them allowing collection and analysis of the types of data discussed herein, as well as participating in the validation of the data discussed herein.

Further to this point, although the embodiments described herein often utilize credit report information as an example of sensitive information, the embodiments described herein are not limited to such examples. Instead, the embodiments described herein may be implemented in any suitable environment in which it is desirable to identify and control specific type of information. As part of implementing the automotive claims process, vehicle loss history, and the lifecycle of a vehicle identification number, a financial institution may be a part of the process. For example, the aforementioned embodiments may be implemented by the financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

With the foregoing, a user may be an insurance customer who may opt-in to a rewards, insurance discount, or other type of program. After the insurance customer provides their affirmative consent, an insurance provider remote server may collect data from the customer's mobile device, smart home controller, smart or autonomous vehicle, or other smart devices—such as with the customer's permission or affirmative consent. The data collected may be related to smart home functionality (or home occupant preferences or preference profiles), smart or autonomous vehicle functionality, and/or insured assets before (and/or after) an insurance-related event, including those events discussed elsewhere herein. In return, risk averse insureds, home or vehicle owners, or home or apartment occupants or vehicle passengers may receive discounts or insurance cost savings related to home, renters, personal articles, auto, mobile, and other types of insurance from the insurance provider.

In one aspect, smart or autonomous vehicle data, smart or interconnected home data, and/or other data, including the types of data discussed elsewhere herein, may be collected or received by an insurance provider remote server, such as via direct or indirect wireless communication or data transmission from a smart or autonomous vehicle, smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants, or vehicle passengers.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method of utilizing blockchain technology to maintain a loss history blockchain after vehicle collisions based upon vehicle sensor data, the method comprising:
   receiving, via one or more processors and/or associated transceivers, an indication of a vehicle being involved a vehicle collision and a vehicle VIN;
   accessing, at a memory, a loss history blockchain associated with the vehicle using the VIN as a key;
   receiving, via the one or more processors and/or associated transceivers, vehicle sensor data generated or collected prior to, during, and/or after the vehicle collision;
   creating, via the one or more processors, a block to add to the loss history blockchain that includes the vehicle sensor data, or otherwise updating the loss history blockchain with the vehicle sensor data associated with the vehicle collision;
   analyzing, via the one or more processors, the vehicle sensor data to reconstruct the vehicle collision; and
   updating, via the one or more processors, the loss history blockchain to include and/or indicate the reconstructed vehicle collision by including the created block.

2. The computer-implemented method of claim 1, further comprising:
   forming a consensus among nodes of the loss history blockchain in a communication network prior to updating, at the memory, the loss history blockchain.

3. The computer-implemented method of claim 1, wherein receiving the vehicle sensor data includes:
receiving, from vehicle-mounted sensors mounted on the vehicle, the vehicle sensor data.

4. The computer-implemented method of claim 1, wherein the vehicle sensor data includes telematics data associated with the vehicle.

5. The computer-implemented method of claim 1, wherein reconstructing the vehicle collision includes:
determining, via the one or more processors, information relating to the vehicle collision including (i) a cause of the vehicle collision, (ii) a likely or estimated complexity of repair, (iii) one or more qualified repair shops, (iv) faulty and working vehicle-mounted sensors, and/or (v) estimate a repair cost.

6. The computer-implemented method of claim 5, wherein determining the cause of the vehicle collision comprises:
assigning, via the one or more processors, fault or lack thereof for the vehicle collision to one or more vehicle operators or autonomous vehicles.

7. The computer-implemented method of claim 5, wherein updating the loss history blockchain includes:
updating, via the one or more processors, the loss history blockchain to include and/or indicate the determined information relating to the vehicle collision.

8. The computer-implemented method of claim 1, wherein updating the loss history blockchain includes:
creating, via the one or more processors, a new block, different than the block that indicates the vehicle sensor data, to add to the loss history blockchain.

9. The computer-implemented method of claim 1, wherein updating the loss history blockchain includes:
updating, via the one or more processors, the block that indicates the vehicle sensor data, to include and/or indicate the reconstructed vehicle collision.

10. The computer-implemented method of claim 1, further comprising:
transmitting, via the one or more processors and/or associated transceivers, the update to the loss history blockchain to other nodes in a communication network.

11. The computer-implemented method of claim 10, wherein one or more nodes in the communication network are associated with a repair shop, a bank, and/or an insurance provider.

12. A system for utilizing blockchain technology to maintain a loss history blockchain after vehicle collisions based upon vehicle sensor data, the system comprising:
a network interface configured to interface with a processor;
a memory configured to store non-transitory computer executable instructions and configured to interface with the processor; and
the processor configured to interface with the memory, wherein the processor is configured to execute the non-transitory computer executable instructions to cause the system to:
receive an indication of a vehicle being involved a vehicle collision and a vehicle VIN;
access a loss history blockchain associated with the vehicle using the VIN as a key;
receive vehicle sensor data generated or collected prior to, during, and/or after the vehicle collision;
create a block to add to the loss history blockchain that includes the vehicle sensor data, or otherwise update the loss history blockchain with the vehicle sensor data associated with the vehicle collision;
analyze the vehicle sensor data to reconstruct the vehicle collision; and
update the loss history blockchain to include and/or indicate the reconstructed vehicle collision by including the created block.

13. The system of claim 12, wherein the instructions, when executed by the processor, cause the system to:
form a consensus among nodes of the loss history blockchain in a communication network prior to updating the loss history blockchain.

14. The system of claim 12, wherein to receive the vehicle sensor data, the instructions, when executed by the processor, cause the system to:
receive, from vehicle-mounted sensors mounted on the vehicle, the vehicle sensor data.

15. The system of claim 12, wherein to reconstruct the vehicle collision, the instructions, when executed by the processor, cause the system to:
determine information relating to the vehicle collision including (i) a cause of the vehicle collision, (ii) a likely or estimated complexity of repair, (iii) one or more qualified repair shops, (iv) faulty and working vehicle-mounted sensors, and/or (v) estimate a repair cost.

16. The system of claim 15, wherein to determine the cause of the vehicle collision, the instructions, when executed by the processor, cause the system to:
assign fault or lack thereof for the vehicle collision to one or more vehicle operators or autonomous vehicles.

17. The system of claim 15, wherein to update the loss history blockchain, the instructions, when executed by the processor, cause the system to:
update the loss history blockchain to include and/or indicate the determined information relating to the vehicle collision.

18. The system of claim 12, wherein to update the loss history blockchain, the instructions, when executed by the processor, cause the system to:
create a new block, different than the block that indicates the vehicle sensor data, to add to the loss history blockchain.

19. The system of claim 12, wherein to update the loss history blockchain, the instructions, when executed by the processor, cause the system to:
update the block that indicates the vehicle sensor data, to include and/or indicate the reconstructed vehicle collision.

20. The system of claim 12, wherein the instructions, when executed by the processor, cause the system to:
transmit the update to the loss history blockchain to other nodes in a communication network.

* * * * *